US012701457B2

(12) United States Patent
Wang et al.

(10) Patent No.: US 12,701,457 B2
(45) Date of Patent: Aug. 4, 2026

(54) COMMUNICATION METHOD AND COMMUNICATION APPARATUS

(71) Applicant: Huawei Technologies Co., Ltd., Shenzhen (CN)

(72) Inventors: Yaxin Wang, Shenzhen (CN); Yanmei Yang, Beijing (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 237 days.

(21) Appl. No.: 18/742,448

(22) Filed: Jun. 13, 2024

(65) Prior Publication Data

US 2024/0334240 A1     Oct. 3, 2024

Related U.S. Application Data

(63) Continuation of application No. PCT/CN2023/139838, filed on Dec. 19, 2023.

(30) Foreign Application Priority Data

Jan. 6, 2023     (CN) .......................... 202310019069.8

(51) Int. Cl.
*H04W 28/02*          (2009.01)
(52) U.S. Cl.
CPC .............................. *H04W 28/0268* (2013.01)
(58) Field of Classification Search
CPC ........... H04W 28/0268; H04W 36/304; H04W 24/08; H04W 28/088; H04W 28/12;
(Continued)

(56) References Cited

U.S. PATENT DOCUMENTS

2007/0028001 A1* 2/2007 Phillips ............... H04L 43/0811
                                                    709/230
2020/0112907 A1* 4/2020 Dao .................. H04M 15/8016
                        (Continued)

FOREIGN PATENT DOCUMENTS

CN          113923800 A     1/2022
WO      2022159400 A1     7/2022
WO      2022217540 A1    10/2022

*Primary Examiner* — Nimesh Patel
(74) *Attorney, Agent, or Firm* — Slater Matsil, LLP

(57)                    ABSTRACT

In a method, a first transmission server determines, based on first quality of service measurement information and/or first quality of service monitoring information, that the first transmission server is to be switched, and determines a second transmission server. Quality of service of serving by the second transmission server connected to the first transmission client via the first access network device and a second user plane function network element satisfies a quality of service requirement of an application layer application. In other words, the first transmission server may determine, based on QoS information obtained through measurement and UE-RAN QoS information, RAN-UPF QoS information, or UE-RAN-UPF QoS information obtained through 5GC monitoring, whether the first transmission server is to be switched. In addition, the first transmission server may determine the second transmission server that satisfies the QoS requirement, so that the first transmission server can be switched to the second transmission server.

20 Claims, 7 Drawing Sheets

(58) Field of Classification Search

CPC ....... H04W 88/06; H04W 28/02; H04W 4/50; H04W 8/02; H04W 28/24; H04W 24/10; H04W 48/18; H04W 92/18; H04W 64/00; H04W 28/10; H04W 72/04; H04W 80/04; H04W 36/08; H04W 72/542; H04W 72/12; H04W 72/543; H04W 8/24; H04W 8/08; H04W 28/0236; H04W 28/0263; H04W 28/06; H04W 72/56; H04W 40/12; H04W 28/18; H04W 4/023; H04W 28/0226; H04W 28/0967; H04W 36/125; H04W 16/18; H04W 36/302; H04W 28/08; H04W 36/32; H04W 36/165; H04W 76/19; H04W 36/385; H04W 24/04; H04W 36/14; H04W 36/142; H04W 36/144; H04W 36/26; H04W 76/12; H04W 76/22; H04W 24/02; H04L 41/5009; H04L 41/5025; H04L 67/61; H04L 41/0894; H04L 65/80; H04L 41/5003; H04L 47/20; H04L 63/20; H04L 41/0806; H04L 12/1407; H04L 47/805; H04L 9/32; H04L 47/10; H04L 45/24; H04L 41/0895; H04L 12/4641; H04L 43/0876; H04L 47/70; H04L 47/125; H04L 47/2416; H04L 9/40; H04L 43/0888; H04L 43/026; H04L 12/28; H04L 43/20; H04L 41/0803; H04L 45/125; H04L 47/6215; H04L 49/205; H04M 15/66; H04M 15/58; H04M 2215/0188; H04M 15/8016; H04M 3/2227; H04M 15/8033; H04M 2203/2022; H04M 2215/32; H04M 3/2236; H04M 15/55; Y02D 30/70; G06N 20/00; G06N 3/08; G06N 3/045; G06N 3/09; G06N 3/0464; G06N 3/044; G06N 3/04; G06N 3/098; G06N 3/02; G06N 5/04; G06N 3/048; G06N 3/047; G06N 3/096; G06N 3/0475

See application file for complete search history.

(56) References Cited

U.S. PATENT DOCUMENTS

| | | | | |
|---|---|---|---|---|
| 2020/0228429 | A1* | 7/2020 | Xin ........................ | H04W 24/02 |
| 2021/0153048 | A1 | 5/2021 | Velev et al. | |
| 2023/0142002 | A1* | 5/2023 | Jin ......................... | H04W 24/02 |
| | | | | 370/252 |
| 2023/0144248 | A1* | 5/2023 | Huang ................... | H04L 67/61 |
| | | | | 709/224 |
| 2023/0354107 | A1* | 11/2023 | Lei ......................... | H04W 36/00 |

* cited by examiner

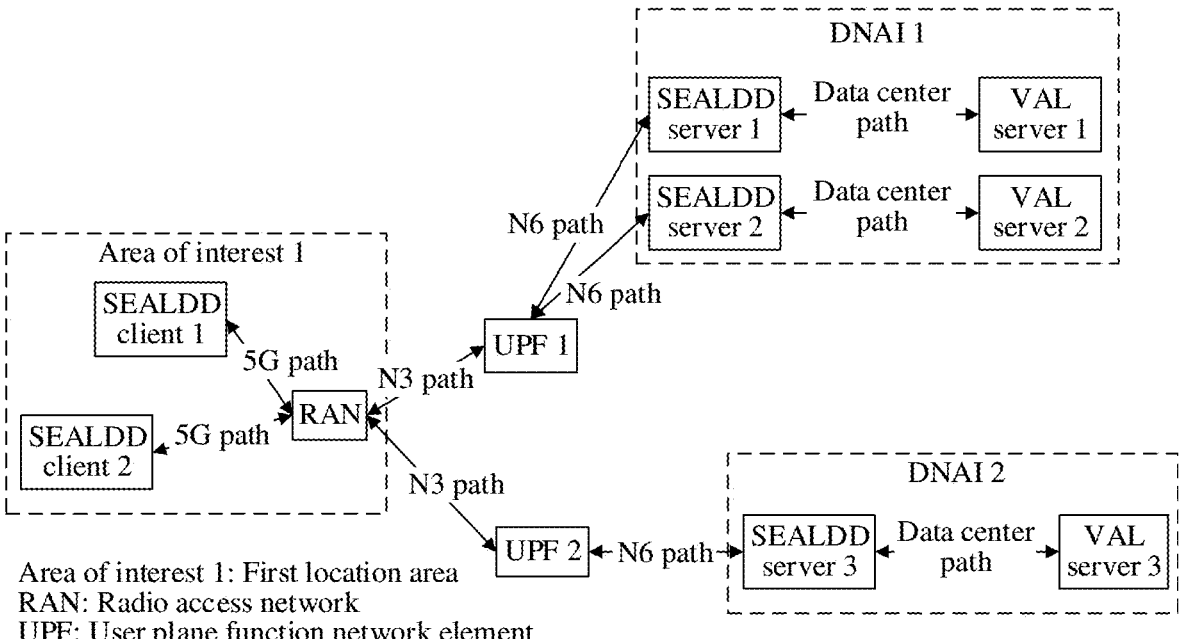

Area of interest 1: First location area
RAN: Radio access network
UPF: User plane function network element
SEALDD client: Service enabler architecture layer data delivery client
SEALDD server: Service enabler architecture layer data delivery server
VAL server: Vertical application layer server
DNAI: Data network access identifier
5G path (5G path): Path between the SEALDD client and the RAN
N3 path (N3 path): Path between the RAN and the UPF
N6 path (N6 path): Path between the UPF and the SEALDD server
Data center path (data center path): Path between the SEALDD server and
the VAL server

FIG. 1

A first transmission server determines, based on first quality of service measurement information and/or first quality of service monitoring information, that the first transmission server is to be switched — S101

The first transmission server determines a second transmission server — S102

FIG. 6

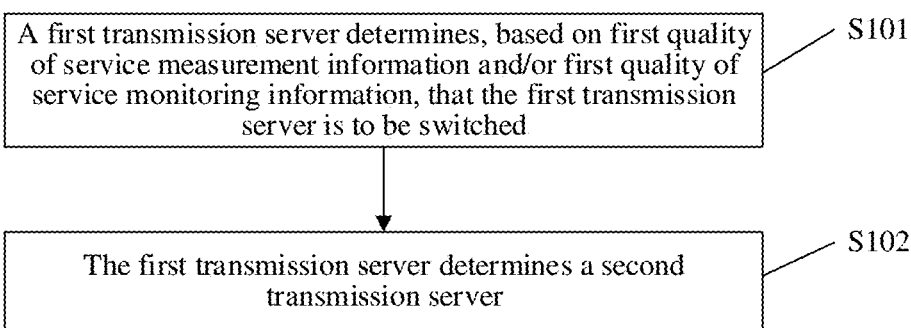

| Core network device | First transmission server | Second transmission server | First application layer server |

S201: Determine a quality of service requirement of an application layer application and information about an available target application layer server S203: Send a fourth message to the core network device, where the fourth message is used to obtain first quality of service monitoring information S202: Send a first message to the second transmission server S204: Determine, based on first quality of service measurement information, that quality of service of serving by the first transmission server connected to a first transmission client via a first user plane function network element and a first access network device does not satisfy the quality of service requirement of the application layer application S205: Obtain at least one of traffic information and load information of an available target transmission server S206: Determine, based on at least one of the traffic information and the load information of the available target transmission server, the second transmission server that satisfies the quality of service requirement of the application layer application

FIG. 7

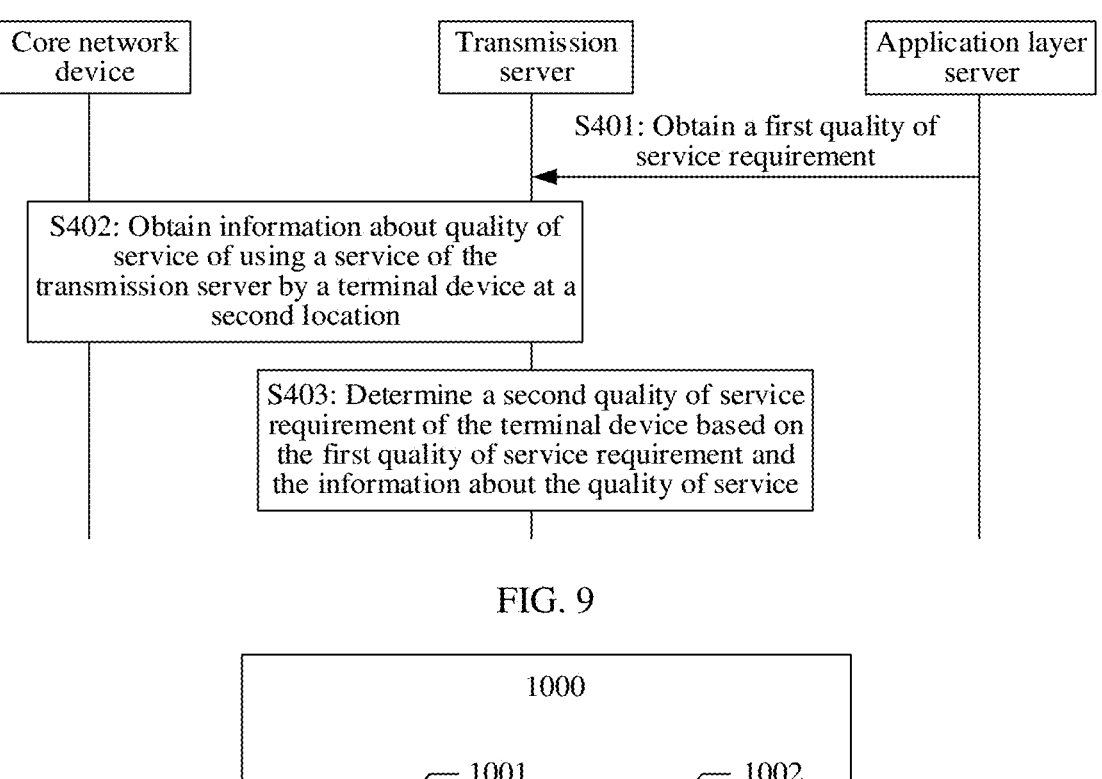
FIG. 9
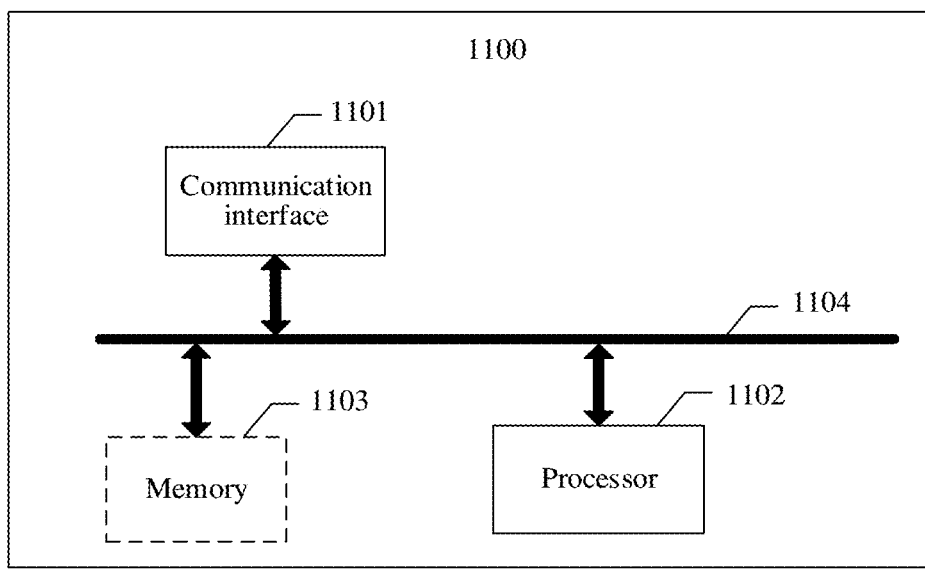
FIG. 10
FIG. 11

COMMUNICATION METHOD AND COMMUNICATION APPARATUS

CROSS-REFERENCE TO RELATED APPLICATIONS

This application is a continuation of International Application No. PCT/CN2023/139838, filed on Dec. 19, 2023, which claims priority to Chinese Patent Application No. 202310019069.8, filed on Jan. 6, 2023. The disclosures of the aforementioned applications are hereby incorporated by reference in their entireties.

TECHNICAL FIELD

This application relates to the field of communication technologies, and in particular, to a communication method and a communication apparatus.

BACKGROUND

Currently, a transmission server (service enabler architecture layer data delivery server, SEALDD server) and a SEALDD client may together provide end-to-end (terminal device to SEALDD server) quality of service measurement (QoS measurement). For example, an application layer server (vertical application layer server, VAL server) may request a data transmission service from the SEALDD server, including a requirement for performing end-to-end QoS measurement. The SEALDD server and the SEALDD client perform QoS measurement and generate a measurement report, where the measurement report includes measurement corresponding to a QoS requirement. However, when measured QoS is poor, how to perform QoS guarantee becomes a problem to be resolved.

SUMMARY

This application provides a communication method and a communication apparatus. In the method, it may be determined that a transmission server needs to be switched, and a second transmission server that satisfies a quality of service requirement of an application layer application is selected, so that switching to the second transmission server can be performed to guarantee quality of service of a current service.

According to a first aspect, this application provides a communication method. The method may be performed by a transmission server, may be performed by a component (for example, a processor, a chip, or a chip system) of the transmission server, or may be implemented by a logical module or software that can implement all or some functions of the transmission server. For example, the method is performed by a first transmission server. The first transmission server determines, based on first quality of service measurement information and/or first quality of service monitoring information, that the first transmission server is to be switched. The first quality of service measurement information includes information about quality of service of serving by the first transmission server connected to a first transmission client via a first user plane function network element and a first access network device. The first quality of service monitoring information includes information about quality of service of a path between the first transmission client and the first access network device and/or information about quality of service of a path between the first access network device and the first user plane function network element. The first transmission server determines a second transmission server. Quality of service of serving by the second transmission server connected to the first transmission client via the first access network device and a second user plane function network element satisfies a quality of service requirement of an application layer application. For example, the first transmission server may determine, based on the first quality of service measurement information, whether the first transmission server is to be switched, or determine, based on the first quality of service measurement information and the first quality of service monitoring information, whether the first transmission server is to be switched. Optionally, the first user plane function network element and the second user plane function network element may be the same or different. Optionally, determining that the first transmission server is to be switched means that an attempt to obtain information about quality of service of another target transmission server may be performed for QoS guarantee of a current service, and whether the switching is finally performed depends on whether the second transmission server that satisfies the quality of service requirement can be selected.

In the method, the first transmission server may determine, based on the QoS information obtained through measurement and UE-RAN QoS information, RAN-UPF QoS information, or UE-RAN-UPF QS information obtained through 5GC monitoring, whether the first transmission server is to be switched (in other words, further determine, based on information about quality of service of another target transmission server, whether the second transmission server that satisfies the quality of service requirement exists). For example, if transmission between the UE and the RAN is normal but overall QoS deteriorates, the deterioration may be caused by abnormal transmission between the RAN and the UPF, abnormal transmission between the UPF and a SEALDD server, or overload of a SEALDD server, and the quality of service may be improved by switching the SEALDD server. In this way, it is determined that the first transmission server needs to be switched. In addition, the first transmission server may determine the second transmission server that satisfies the QoS requirement, so that the first transmission server can be switched to the second transmission server. This helps QoS guarantee.

In a possible implementation, when the first transmission server determines, based on the first quality of service measurement information, that the quality of service of serving by the first transmission server connected to the first transmission client via the first user plane function network element and the first access network device does not satisfy the quality of service requirement of the application layer application, and/or when the quality of service of the path between the first transmission client and the first access network device satisfies a quality of service requirement of a first path, the first transmission server determines that the first transmission server is to be switched.

In the method, the first transmission server may determine, based on the QoS information obtained through measurement, that the quality of service does not satisfy the quality of service requirement of the application layer application (for example, QoS of a data flow deteriorates). If the QoS information or transmission between the UE and the RAN is normal (or no abnormality between the UE and the RAN is fed back (where for example, reporting is performed based on a threshold, and if the QoS information is less than the threshold, it is fed back that abnormality exists between the UE and the RAN)), it is determined that the first transmission server needs to be switched. This helps QoS guarantee.

In a possible implementation, the first transmission server receives information about an available target application layer server from a first application layer server, where the information about the available target application layer server is used to determine an available target transmission server. The first transmission server sends a first message to the available target transmission server, where the first message is used to obtain at least one of traffic information and load information of the available target transmission server. The available target transmission server includes one or more transmission servers. For example, the first message is used to subscribe to at least one of the traffic information and the load information of the available target transmission server. In this case, for the first message, a subsequent QoS measurement result is fed back by using a notification message. For another example, the first message is used to request at least one of the traffic information and the load information of the available target transmission server. In this case, for the first message, a subsequent QoS measurement result is fed back by using a response message.

In a possible implementation, the first transmission server sends the first message to the available target transmission server when the quality of service of serving by the first transmission server connected to the first transmission client via the first user plane function network element and the first access network device does not satisfy the quality of service requirement of the application layer application, and quality of service of a first transmission client—first access network device—first user plane function network element path satisfies a quality of service requirement of a second path.

In the foregoing method, the first transmission server may obtain the corresponding available target transmission server based on the information about the available target application layer server. The first transmission server may obtain one or more of the traffic information and the load information from the available target transmission server. This helps the first transmission server determine the second transmission server. Optionally, a precondition for a case in which the first transmission server sends the first message to the available target transmission server may be: The quality of service of serving by the first transmission server connected to the first transmission client via the first user plane function network element and the first access network device does not satisfy the quality of service requirement of the application layer application, and the quality of service of the path, the first transmission client-the first access network device-the first user plane function network element, satisfies the quality of service requirement of the second path.

In a possible implementation, the first transmission server determines the quality of service requirement of the application layer application, and the first transmission server obtains at least one of the traffic information and the load information of the available target transmission server. The first transmission server determines, based on at least one of the traffic information and the load information of the available target transmission server, the second transmission server that satisfies the quality of service requirement of the application layer application, where the second transmission server is one of the available target transmission server.

In the method, the first transmission server may determine, based on one or more of the following information: the load information and an N6 transmission status (namely, the traffic information) that are obtained from the available target transmission server, to select the second transmission server, so that the first transmission server can be switched to the second transmission server. This helps QoS guarantee.

In a possible implementation, the first transmission server receives information about an available target application layer server from a first application layer server, where the information about the available target application layer server is used to determine information about an available target transmission server. The first transmission server obtains information about quality of service of the available target transmission server.

In a possible implementation, the first transmission server obtains a first location of the first transmission client. The first transmission server sends a second message to the available target transmission server, where the second message includes the first location and/or the information about the available target application layer server.

In a possible implementation, the second message is used to obtain information about quality of service of using the available target transmission server at the first location. The available target transmission server includes one or more transmission servers.

In the foregoing method, the first transmission server may obtain the available target transmission server based on the information about the available target application layer server. The first transmission server may request to obtain, from the available target transmission server, the information about the QoS of using the available target transmission server at the first location. This helps the first transmission server determine the second transmission server.

In a possible implementation, the first transmission server obtains a first location of the first transmission client. The first transmission server sends a third message to a core network device, where the third message includes one or more of the following information: the first location, the information about the available target transmission server, or a data network access identifier associated with the available target transmission server.

In a possible implementation, the third message is used to obtain information about quality of service of using the available target transmission server at the first location. The available target transmission server includes one or more transmission servers.

In a possible implementation, the core network device is a network data analytics function network element.

In the foregoing method, the first transmission server may obtain the available target transmission server based on one or more of the following information: the first location, the information about the available target transmission server, or the data network access identifier associated with the available target transmission server. In addition, the first transmission server may request to obtain, from the core network device, the information about the QoS of using the available target transmission server at the first location. This helps the first transmission server determine the second transmission server.

In a possible implementation, the first transmission server determines the quality of service requirement of the application layer application. The first transmission server obtains information about quality of service of using the available target transmission server at the first location. The first transmission server determines, based on the information about the quality of service, the second transmission server that satisfies the quality of service requirement of the application layer application, where the second transmission server is one of the available target transmission server.

In the method, the first transmission server may select the second transmission server based on the obtained information about the QoS of using the available target transmission server at the first location, so that the first transmission server can be switched to the second transmission server. This helps QoS guarantee.

In a possible implementation, the first transmission server sends a fourth message to a core network device, where the fourth message is used to obtain the first quality of service monitoring information.

In the method, the first transmission server may obtain the first quality of service monitoring information from the core network device. This helps determine whether the first transmission server needs to be switched. For example, the first transmission server may obtain QoS monitoring information from the core network device by default. Alternatively, the first transmission server may send the fourth message to the core network device when the QoS deteriorates (when the information about the quality of service does not satisfy the QoS requirement), to obtain QoS monitoring information.

According to a second aspect, this application provides another communication method. The method may be performed by a transmission server, may be performed by a component (for example, a processor, a chip, or a chip system) of a transmission server, or may be implemented by a logical module or software that can implement all or some functions of a transmission server. For example, the method is performed by a second transmission server. The second transmission server receives a first message from a first transmission server, where the first message is used to obtain at least one of traffic information and load information of the second transmission server. The second transmission server sends at least one of the traffic information and the load information of the second transmission server to the first transmission server, where at least one of the traffic information and the load information of the second transmission server is used by the first transmission server to determine a transmission server that satisfies a quality of service requirement of an application layer application.

In a possible implementation, the second transmission server is one of an available target transmission server, and the available target transmission server is determined by the first transmission server based on information about an available target application layer server.

In a possible implementation, the second transmission server receives the first message from the first transmission server when quality of service of serving by the first transmission server connected to a first transmission client via a first user plane function network element and a first access network device does not satisfy the quality of service requirement of the application layer application, and quality of service of a first transmission client—first access network device—first user plane function network element path satisfies a quality of service requirement of a second path.

In the foregoing method, if the second transmission server is one of the available target transmission server, the first transmission server may obtain the corresponding available target transmission server based on the information about the available target application layer server, to obtain the traffic information and the load information of the second transmission server. This helps the first transmission server determine the second transmission server. Optionally, a precondition for a case in which the first transmission server sends the first message to the available target transmission server may be: The quality of service of serving by the first transmission server connected to the first transmission client via the first user plane function network element and the first access network device does not satisfy the quality of service requirement of the application layer application, and the quality of service of the path, the first transmission client-the first access network device-the first user plane function network element, satisfies the quality of service requirement of the second path.

According to a third aspect, this application provides another communication method. The method may be performed by a transmission server, may be performed by a component (for example, a processor, a chip, or a chip system) of a transmission server, or may be implemented by a logical module or software that can implement all or some functions of a transmission server. For example, the method is performed by a second transmission server. The second transmission server receives a second message from a first transmission server, where the second message includes a first location and/or information about an available target application layer server, the first location includes a location area in which a first transmission client served by the first transmission server is located, the information about the available target application layer server is used to determine information about an available target transmission server, and the available target transmission server includes the second transmission server. The second transmission server sends, to the first transmission server, information about quality of service of using the second transmission server at the first location, where the information about the quality of service is used by the first transmission server to determine the second transmission server that satisfies a quality of service requirement of an application layer application.

In a possible implementation, the second message is used to obtain the information about the quality of service of using the available target transmission server at the first location.

In the foregoing method, if the second transmission server is any one of the available target transmission server, the first transmission server may obtain the corresponding available target transmission server based on the information about the available target application layer server and/or the first location, to obtain the information about the QoS of using the available target transmission server at the first location. This helps the first transmission server determine the second transmission server.

According to a fourth aspect, this application provides another communication method. The method may be performed by a transmission server, may be performed by a component (for example, a processor, a chip, or a chip system) of a transmission server, or may be implemented by a logical module or software that can implement all or some functions of a transmission server. The transmission server obtains a first quality of service requirement. The transmission server obtains information about quality of service of using a service of the transmission server by a transmission client at a second location. The transmission server determines a second quality of service requirement of the transmission client based on the first quality of service requirement and the information about the quality of service, where the second quality of service requirement includes a set of one or more quality of service parameters. For example, that the transmission server obtains a first quality of service requirement may be: The transmission server directly receives the first quality of service requirement from an application layer server. Alternatively, the transmission server may determine the first quality of service requirement based on a related parameter from an application layer server. This is not limited in this application. For another example, the information about the quality of service of using the service of the transmission server by the transmission client at the second location may also be referred to as predicted information about quality of service.

In the method, after obtaining the first quality of service requirement, the transmission server may determine the second quality of service requirement based on the information about the quality of service and the first quality of service requirement, to perform QoS guarantee.

In a possible implementation, the transmission server sends a fifth message to a network data analytics function network element, where the fifth message is used to obtain the information about the quality of service based on information about the transmission client and service information of the transmission server. The transmission server receives the information about the quality of service from the network data analytics function network element.

In the method, the transmission server may obtain, from the network data analytics function network element, the information about the quality of service of using the service of the transmission server by the transmission client at the second location. This helps the transmission server determine the second quality of service requirement, to perform QoS guarantee.

In a possible implementation, the transmission server sends a request message to a core network device, where the request message is used to request the core network device to provide guarantee of the second quality of service requirement, and the second quality of service requirement includes a set of one or more quality of service parameters.

In the method, the transmission server may request guarantee of an alternative quality of service requirement (alternative QoS requirement) from the core network device. This helps perform QoS guarantee more comprehensively.

In a possible implementation, the core network device is a network exposure function network element or a policy control function network element.

According to a fifth aspect, this application provides a communication apparatus. The communication apparatus may be a transmission server, an apparatus in the transmission server, or an apparatus that can be used together with the transmission server. In a possible implementation, the communication apparatus may include modules that are in one-to-one correspondence with the method/operations/steps/actions described in any one of the first aspect to the fourth aspect and the possible implementations of the first aspect to the fourth aspect. The modules may be hardware circuits, may be software, or may be implemented by hardware circuits in combination with software. In a possible implementation, the communication apparatus may include a processing unit and a communication unit.

It may be understood that the communication apparatus may also implement effects that can be implemented in any one of the first aspect to the fourth aspect and the possible implementations of the first aspect to the fourth aspect.

According to a sixth aspect, this application provides a communication apparatus, including a processor and a memory. The memory is configured to store instructions. When the instructions are executed by the processor, the communication device is enabled to implement the method in any one of the first aspect to the fourth aspect and the possible implementations of the first aspect to the fourth aspect. Optionally, the processor is coupled to the memory.

According to a seventh aspect, this application provides a computer-readable storage medium. The computer-readable storage medium stores instructions. When the instructions are run on a computer, the computer is enabled to perform the method in any one of the first aspect to the fourth aspect and the possible implementations of the first aspect to the fourth aspect.

According to an eighth aspect, this application provides a chip system. The chip system includes a processor and an interface, and may further include a memory, configured to implement the method in any one of the first aspect to the fourth aspect and the possible implementations of the first aspect to the fourth aspect. The chip system may include a chip, or may include a chip and another discrete component.

According to a ninth aspect, this application provides a computer program product, including instructions. When the instructions are run on a computer, the computer is enabled to perform the method in any one of the first aspect to the fourth aspect and the possible implementations of the first aspect to the fourth aspect.

BRIEF DESCRIPTION OF DRAWINGS

FIG. 1 is a diagram of a communication system according to this application;

FIG. 6 is a schematic flowchart of a communication method according to this application;

FIG. 7 is a schematic flowchart of another communication method according to this application;

FIG. 9 is a schematic flowchart of yet another communication method according to this application;

FIG. 10 is a diagram of a communication apparatus according to this application; and FIG. 11 is a diagram of another communication apparatus according to this application.

DESCRIPTION OF EMBODIMENTS

Figure 2:
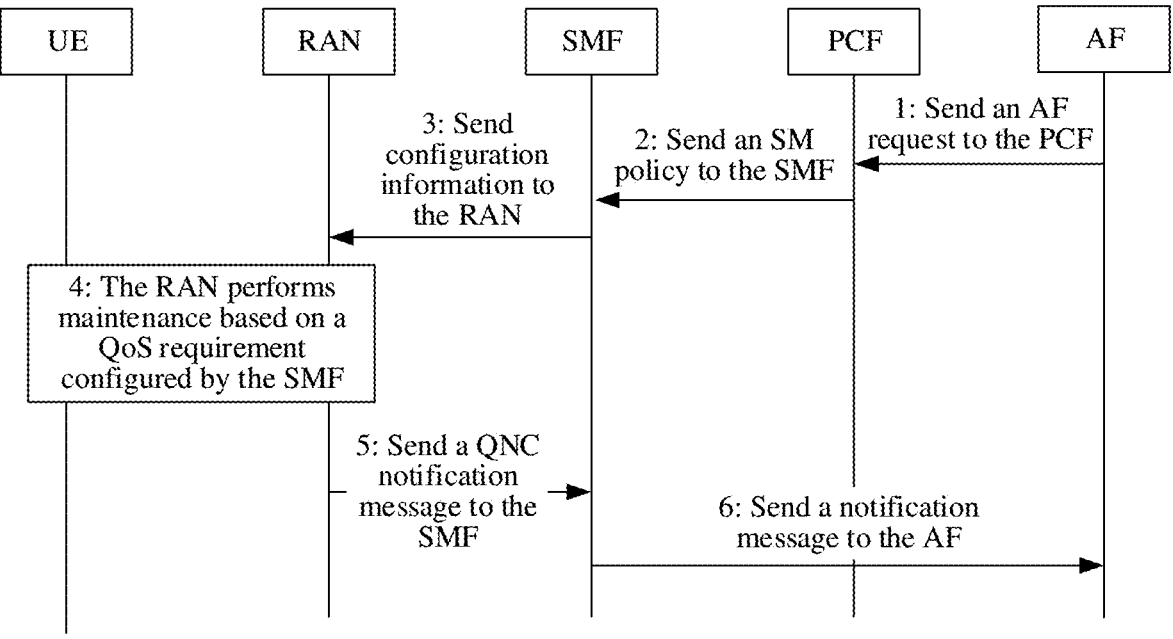
FIG. 2 is a schematic flowchart of alternative QoS requirement adjustment.

In embodiments of this application, "/" may represent an "or" relationship between associated objects. For example, A/B may represent A or B. "And/or" may be used to indicate that three relationships exist between associated objects. For example, A and/or B may represent the following three cases: Only A exists, both A and B exist, and only B exists. A and B may be singular or plural. To facilitate description of the technical solutions in embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the terms such as "example" or "for example" are used to represent an example, an illustration, or a description. Any embodiment or design scheme described with "example" or "for example" should not be explained as being more preferred or having more advantages than another embodiment or design scheme. Use of the terms such as "example" or "for example" is intended to present a related concept in a specific manner for ease of understanding.

The following describes the technical solutions in embodiments of this application with reference to the accompanying drawings in embodiments of this application.

To resolve a problem of how to perform QoS guarantee when a quality of service measurement result obtained through quality of service measurement by a transmission server and a transmission client is poor, this application provides a communication method. According to the communication method, a second transmission server that satisfies a quality of service requirement of an application layer application may be determined, so that switching can be performed. This helps guarantee quality of service.

A service enabler architecture layer data delivery (service enabler architecture layer data delivery, SEALDD) service described in this application may be referred to as a SEALDD service for short. A service enabler architecture layer data delivery server may be referred to as a transmission server for short, or referred to as a SEALDD server for short. A service enabler architecture layer data delivery client may be referred to as a transmission client for short, or referred to as a SEALDD client for short. It may be understood that the foregoing abbreviation is merely an example, and the SEALDD server/client each may implement the service enabler architecture layer data delivery service described above. In other words, all parts briefly referred to as SEALDD in this application may be replaced with service enabler architecture layer data delivery. Optionally, the transmission server in this application may also be referred to as a data transmission enhancement layer server (mainly configured to provide a data transmission service, and belonging to an enabler layer or an enhancement layer).

Information about quality of service described in this application may refer to QoS (quality of service), or may refer to service of experience (QoE, also referred to as service experience). In other words, all parts briefly referred to as QoS, QoE, and service experience in this application may be replaced with quality of service.

The communication method provided in this application may be applied to a communication system shown in FIG. 1. For example, the communication system may be a service enabler architecture layer data delivery service architecture (for example, referred to as a SEALDD service architecture for short). The communication system includes devices such as a terminal device (including a SEALDD client, a radio access network (RAN) device, a core network device, a SEALDD server, and an application layer server (vertical application layer server, VAL server)).

The core network device may include but is not limited to one or more of the following devices or network elements: a user plane function (UPF) network element, an application function (AF) network element, an access and mobility management (access and mobility management function, AMF) network element, a session management (session management function, SMF) network element, a policy control function (PCF) network element, and the like. The AMF is mainly responsible for mobility management in a mobile network, for example, user location update, registration of a user with a network, and user switching. The SMF is mainly responsible for session management in the mobile network, for example, session establishment, modification, and release. Specific functions may be, for example, allocating an IP address to the user and selecting a UPF that provides a packet forwarding function. The PCF is responsible for providing policies such as a QoS policy and a slice selection policy for the AMF and the SMF. The AF is responsible for providing a service for a network, for example, affecting service routing and interacting with the PCF to perform policy control. The UPF is mainly responsible for processing a user packet, for example, forwarding and charging. The UPF may be further configured to provide mobility during wireless access. In this case, the UPF is also referred to as a protocol data unit session anchor (PDU (protocol data unit) session anchor UPF, PSA UPF).

The SEALDD client may be used as a part of the terminal device, and runs on the terminal device in a form of software or a system component. The SEALDD server is deployed between the UPF and an application server (AS) in a form of an independent or integrated server. For example, the SEALDD server may be an independent server, and may be deployed between the UPF and the AS, as shown in FIG. 1. For another example, the SEALDD server may integrate a function of the SEALDD server into the UPF, or integrate a function of the SEALDD server into the AS. Optionally, a plurality of SEALDD servers may be deployed in a distributed manner based on deployment statuses of the UPF and the AS.

For example, that a user plane connection between the SEALDD client and the SEALDD server is deployed on a session in a 5th generation 5G system may be represented as follows: UE accesses the network through an air interface of a RAN, and the RAN and the UPF are connected through an N3 interface, so that the RAN can be connected to UPFs that are at different levels. Assuming that different SEALDD servers correspond to different cloud platforms, the different SEALDD servers are connected to different VAL servers on the cloud platforms. When the UE is connected to a SEALDD server 1 via a RAN and a UPF 1 and performs service interaction with a VAL server 1 via the SEALDD server 1, if the network detects that data transmission quality is poor, the network may be optimized based on different causes. For example, if the poor data transmission quality is caused by overload of the SEALDD server or the VAL server or abnormal transmission over an N6 interface, the network may be optimized by keeping the RAN and the UPF unchanged and switching the SEALDD server and the VAL server, to improve the quality of service. For another example, if the poor data transmission quality is caused by congestion generated due to overload of the UPF or overload of an N3 transmission path, the network may be optimized by keeping the RAN unchanged and switching the UPF, the corresponding SEALDD server, and the corresponding VAL server, to improve the quality of service.

Specifically, the terminal device may be user equipment (UE), a terminal, a mobile phone, an internet of things terminal device (for example, an in-vehicle device or a wearable device), a terminal device in a 5G network, a terminal device in a future evolved PLMN network, a terminal device in a next-generation (for example, 6G) network, or the like. The radio access network device may be a device that can communicate with the terminal device. The radio access network device may be a base station (BS), a relay station, or an access point (AP). The base station may be an evolved NodeB (eNB or eNodeB for short) in a long term evolution (LTE) system, may be a gNodeB in a new radio (NR) network, may be a wireless device in a next generation radio access network (NG (next generation) RAN), may be a wireless controller in a cloud radio access network (CRAN) scenario, or may be an AP in a wireless fidelity (Wi-Fi) network, a BS in a worldwide interoperability for microwave access (WiMAX) network, or the like.

I. Definitions of Related Terms in This Application

1. Alternative QoS Requirement (Alternative QoS Requirement) Adjustment Procedure:

Currently, SA2 supports QoS requirement adjustment, for example, including adjustment for parameters such as a guaranteed flow bit rate (GFBR), a packet delay budget (PDB), a packet error rate (Packet Error Rate, PER), and the like. When a RAN detects that a QoS requirement cannot be satisfied, the RAN may trigger sending of a notification message to an AF. Alternatively, the RAN triggers alternative QoS adjustment, levels down QoS guarantee, and notifies the AF. Specifically, the AF may propose an alternative QoS requirement. If a RAN side cannot satisfy the QoS requirement of the AF, QoS adjustment may be performed and a corresponding alternative QoS reference may be reported.

For example, FIG. 2 is a schematic flowchart of alternative QoS requirement adjustment. The following steps are included.

Step 1: An AF sends a request message (for example, an AF request) to a PCF (possibly via a network exposure function (NEF)).

The request message may include but is not limited to one or more of the following: an application descriptor, QoS requirement information, QoS notification control (QNC) information, an alternative QoS set (where the alternative QoS set includes a plurality of QoS requirements, and the plurality of QoS requirements may be sorted based on priorities and satisfied in descending order of priorities), and the like. The application descriptor may be an application ID, an IP 5-tuple, or the like. The alternative QoS set includes a plurality of alternative QoS levels, and a network may preferentially satisfy, based on the priorities, QoS with the highest priority. If a current network condition cannot satisfy the QoS, a lower-priority QoS is selected to be satisfied, and the AF is notified. If a lowest-priority QoS cannot be satisfied, a service is released, and the AF is notified.

Step 2: The PCF determines, based on the QoS requirement information and the application descriptor in the request message, QoS flow identifier (QFI) information corresponding to an application data flow, generates corresponding session management policy (SM policy) information, and delivers the session management policy information to an SMF.

Step 3: The SMF generates configuration information based on the policy information corresponding to the QFI, and sends the configuration information to a RAN. The configuration information includes one or more of the following: a QFI corresponding to a QoS flow, a QoS requirement corresponding to the QFI, and QNC indication information.

Step 4: The RAN performs maintenance based on the QoS requirement configured by the SMF.

The SMF submits a QoS monitoring request to the RAN via an AMF. The RAN detects uplink and downlink QoS (for example, delay) on a UE side. If a QoS requirement of the AF cannot be satisfied, the RAN reports to the SMF. Optionally, if the RAN cannot satisfy a QoS profile parameter provided by the SMF, when sending a QoS notification to the SMF, the RAN may report alternative QoS profile reference information that can be currently matched. Optionally, when the RAN has no candidate QoS profile, if a current QoS requirement (for example, a GFBR, a PDB, or a PER) cannot be satisfied, the RAN sends a notification (radio link failure and congestion on the RAN side) to the SMF to indicate that the current QoS requirement cannot be satisfied. The RAN still keeps the QoS flow, and releases a resource corresponding to the QoS flow. After the RAN sends the notification to the SMF, the SMF further sends information about the notification to the PCF. Optionally, in an alternative QoS status, when the RAN cannot satisfy the QoS profile parameter, the RAN can report, to the SMF based on a priority sequence of alternative QoS, alternative QoS that can be satisfied. The RAN can also detect (at a specific time interval) and report a status of the QoS that can be satisfied currently. The SMF can further report the alternative QoS satisfaction status to the PCF.

Optionally, in an inter-base station switching scenario, a source RAN transmits corresponding QoS profile and alternative QoS profile information to a target RAN, and then the target RAN determines whether a QoS requirement can be satisfied, and reports to the source RAN. Optionally, in a QoS flow establishment or modification process, the RAN can determine whether a QoS profile and an alternative QoS profile can be satisfied, and report, to the SMF (for example, in N2 SM information), information about alternative QoS that is satisfied. Optionally, the SMF may further report a QoS satisfaction status to the PCF. If the PCF does not have a special indication, the SMF may indicate the QoS satisfaction status to UE through NAS information.

Step 5: When the RAN detects that a current status of the RAN cannot support the corresponding QoS requirement, the RAN sends a QNC notification message to the SMF. The QNC notification message includes information indicating that a current QoS requirement corresponding to the AF cannot be satisfied or information indicating that the alternative QoS adjustment is performed.

Step 6: After receiving the QNC notification message, the SMF sends a notification message to the AF. The notification message includes the information indicating that the QoS requirement cannot be satisfied or the information indicating that the alternative QoS adjustment is performed. In other words, when the QoS cannot be satisfied or the original QoS requirement is adjusted to alternative QoS, the AF needs to be notified.

2. QoS Monitoring Mechanism:

In a standard protocol related to SA2, the QoS monitoring mechanism is used to monitor a packet delay. For example, the QoS monitoring mechanism is used to measure/monitor delays between UE, a RAN, and a UPF, where the delays may be classified into a delay between the UE and the RAN, a delay between the RAN and the UPF, or a delay between the UE, the RAN, and the UPF. For a QoS monitoring requirement, the RAN may detect an uplink delay and a downlink delay between the UE and the RAN. The delay between the RAN and the UPF is measured at a granularity of a terminal device (per UE), a data flow (per QoS flow), or a GPRS tunneling transmission protocol-user plane (GPRS tunneling protocol-user plane, GTP-U). A specific measurement granularity depends on an operator configuration, a request of a third-party AF, or policy control of a PCF. This is not limited in this application.

Optionally, if the AF sends a QoS monitoring request, the PCF may generate a corresponding QoS monitoring policy based on the request, and adds the QoS monitoring policy to a policy and charging control (PCC) rule. The PCC rule may be sent by the PCF to the SMF. For example, the QoS monitoring policy may include but is not limited to one or more of the following information: a QoS parameter that needs to be measured (for example, a parameter such as an uplink delay, a downlink delay, or a round-trip delay), a measurement reporting periodicity (for example, when a periodic triggering mode is used, a reporting periodicity needs to be set), a measurement reporting threshold (for example, when an event triggering mode is used, an event reporting threshold needs to be set), a QoS measurement reporting path/a target entity to which measurement is reported (for example, a PCF/an AF/a local NEF to which reporting is performed), a direct measurement reporting indication, and the like. Information such as an uplink delay, a downlink delay, or a round-trip delay monitored by the UPF may be reported to the SMF through an N4 interface, and then the SMF reports the information to the PCF. Optionally, the AF may directly or indirectly subscribe to a related event from the PCF via the NEF. For example, the AF may subscribe to QoS monitoring, and may further receive a related delay measurement result from the PCF, where the delay result obtained by the PCF is obtained from the SMF.

Optionally, the SMF may send an N1N2MessageTransfer message to the AMF, where N2 SM information sent to the RAN may carry information such as QoS monitoring indication information and QoS monitoring frequency. After receiving the QoS monitoring indication information sent by the SMF via the AMF, the RAN can start measurement of the uplink delay between the UE and the RAN. Specific delay measurement frequency is the QoS monitoring frequency. Optionally, the RAN may reject the QoS monitoring. For example, after an NG-RAN receives an N2 message (the N2 message includes the QoS monitoring indication information and the like) sent by the SMF via the AMF, the RAN may reject, due to a load condition and the like, to perform the QoS monitoring. Optionally, the SMF may deliver the QoS monitoring policy to the UPF. For example, the SMF may send an N4 rule to the UPF through an N4 session modification request message, where the N4 rule includes the QoS monitoring policy.

The following describes different scenarios of the QoS monitoring.

Scenario 1: QoS monitoring between the NG-RAN and a PSA UPF. A measurement granularity is per UE or per QoS flow.

First, the network performs QoS measurement activation, including per QoS flow end-to-end (UE-RAN-PSA UPF) QoS measurement activated by the SMF in a PDU establishment or modification procedure. For example, the SMF sends a QoS monitoring request message to the PSA UPF through the N4 interface, and the SMF sends a QoS monitoring request message to the NG-RAN through an N2 interface. The QoS monitoring request message includes a QoS monitoring parameter determined by the SMF based on a QoS monitoring policy that is locally configured or the QoS monitoring policy received from the PCF.

Then, the NG-RAN receives the QoS monitoring request message and starts the QoS monitoring. For example, a RAN node starts, based on the QoS monitoring request message from the SMF, uplink or downlink delay detection on a RAN side. The RAN node may send, to the PSA UPF through an uplink data packet or an uplink null packet, an uplink or downlink delay measurement result obtained through detection by the RAN node. For example, delay measurement and monitoring between the NG-RAN and the PSA UPF includes the following steps.

(1) The PSA UPF sends a monitoring data packet to the RAN based on a QoS reporting frequency received from the SMF. For the monitoring data packet, the PSA UPF may include, in a GTP-U header, a QFI identifier, the QoS monitoring indication information, time T1 at which the PSA UPF sends a downlink monitoring data packet, and the like.

(2) The NG-RAN receives the monitoring data packet from the PSA UPF, and records time T2 at which the downlink monitoring data packet is received and the time T1 at which the UPF sends the downlink monitoring data packet.

(3) The NG-RAN receives an uplink data packet from the UE, and sends the uplink data packet to the PSA UPF to measure an uplink delay. Alternatively, the NG-RAN directly sends an uplink null packet to the PSA UPF to measure an uplink delay. For example, the NG-RAN may encapsulate, into the GTP-U header, the QoS monitoring indication information, an uplink delay result or a downlink delay result obtained through measurement by the RAN, the T1, the T2, time T3 at which the NG-RAN sends an uplink monitoring data packet, and the like.

(4) The PSA UPF receives the uplink monitoring data packet from the NG-RAN and records time T4 at which the uplink monitoring data packet is received. On this basis, the PSA UPF can calculate a round-trip delay between the PSA UPF and the NG-RAN, or a one-way uplink delay or downlink delay. In addition, if the NG-RAN includes, in the GTP-U header, a delay that is between the UE and the NG-RAN and that is measured by the NG-RAN, the PSA UPF may obtain a delay status between the UE and the RAN.

(5) The PSA UPF reports the QoS measurement result. For example, the PSA UPF reports based on a size of a delay measurement result (the delay between the UE and the RAN or a delay between the UE, the RAN, and the PSA UPF). If the delay measurement result is greater than a delay threshold delivered by the SMF, the UPF sends the delay measurement result to the SMF through the N4 interface. Optionally, in a redundant session dual-connectivity transmission scenario, the UPF may send delay measurement results of two uplink paths to the SMF.

Scenario 2: QoS monitoring between the NG-RAN and the PSA UPF. A measurement granularity is a GTP-U granularity.

The SMF may activate, according to a local configuration policy, the RAN for QoS monitoring on GTP-U paths between the RAN and all UPFs connected to the RAN. For example, if the PCF sends the QoS monitoring policy to the SMF, and the QoS monitoring is not activated by a differentiated services code point (DSCP) corresponding to a 5QI in the PCC rule, the SMF may activate all the related UPFs for a PDU session and the RAN, to perform the QoS monitoring. For example, when the QoS monitoring includes performing delay monitoring, a GTP-U endpoint (for example, a GTP-U sender or a GTP-U receiver) may compare, according to the QoS monitoring policy (namely, a PDB parameter) received from the SMF, a data packet delay obtained through measurement with the PDB parameter. If the data packet delay exceeds the PDB parameter, the UPF may send alarm information to the SMF or an operation, administration, and maintenance (OAM), where the alarm information indicates that the data packet delay exceeds the PDB parameter. The RAN may measure and send (for example, send through an N3 interface), to the UPF, an uplink or downlink data packet delay obtained through measurement by a RAN side. The UPF may calculate an uplink or downlink data packet delay of the N3 interface/an N9 interface (where the N9 is applicable when an intermediate UPF (I-UPF) exists). Then, the UPF may report a QoS monitoring result. For example, the UPF may send the QoS monitoring result to the SMF through the N4 interface, or the UPF may send the QoS monitoring result to the AF via a local NEF.

3. N4 Interface Reporting Procedure Between a UPF and an SMF:

The UPF may use an N4 reporting procedure to report a related event to the SMF. For example, the UPF may send an N4 session report message to the SMF. After receiving the N4 session report message, the SMF may send an N4 session report acknowledgment message to the UPF. A reporting trigger event on a UPF side is configured and provided by the SMF.

Optionally, when QoS monitoring is performed, the SMF may configure the UPF to report a delay detection result. For example, the UPF may calculate an uplink data packet delay or a downlink data packet delay (for example, calculate a delay between a RAN and the UPF, or calculate a delay between UE and the UPF). If a data packet delay obtained through measurement and calculation exceeds a specified threshold, or a reporting periodicity expires, the UPF may report the delay detection result to the SMF, where the delay detection result includes that the data packet delay exceeds the specified threshold, or the reporting periodicity expires. Specifically, an N4 reporting path may be, for example, UPF-SMF-PCF-(NEF)-AF, and a reporting path may be specified by the PCF in a PCC rule. The UPF may report a QoS monitoring notification to the AF through a service-oriented interface. For example, the UPF may feed back and report a QoS monitoring result (for example, including an uplink delay, a downlink delay, or a round-trip delay) to the AF by using a Nnef_AFsessionWithQoS_Notify service of the NEF network element. Optionally, the QoS monitoring result may be reported to an API corresponding to the AF. For example, the QoS monitoring result (including the uplink delay, the downlink delay, the round-trip delay, or the like) may be fed back to the AF by using the Nnef_AFsessionWithQoS_Notify service of the NEF network element.

Figure 3:
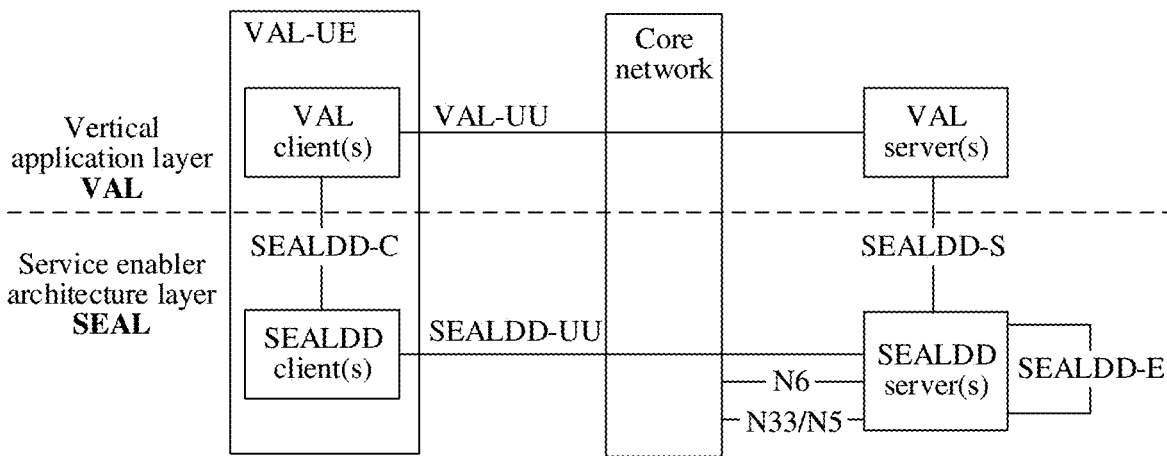
FIG. 3 is a diagram of a SEALDD enhancement layer architecture.

4. SEALDD Enhancement Layer Architecture:

FIG. 3 is a diagram of a SEALDD enhancement layer architecture. A SEALDD enhancement layer includes a SEALDD client and a SEALDD server. As a part of UE, the SEALDD client runs on the UE in a form of software or a system component. The SEALDD server shown in FIG. 3 may be deployed between a UPF and an AS, or. An interface structure between modules shown in FIG. 3 includes: A VAL client communicates with the SEALDD client through a SEALDD-C interface, and the VAL server communicates with the SEALDD server through a SEALDD-S interface. User plane data transmission between the SEALDD client and the SEALDD server is performed through a SEALDD-UU interface. The SEALDD-UU interface is carried on a user plane session constructed by a 3GPP network system. The SEALDD server may perform control-plane message communication with a PCF through an N33/N5 interface. For example, the N5 interface is an interface between an AF and the PCF. N33 is an interface between the AF and a NEF. The AF may indirectly communicate with the PCF via the NEF. The SEALDD server may send an AF request to a 5GC or subscribe to a notification from the 5GC. The SEALDD server may further perform user plane data transmission with the UPF through an N6 interface. SEALDD servers interact with each other through a SEALDD-E interface, including control-plane context transmission and user-plane data forwarding. It may be understood that the VAL client may be an AC in the UE. The VAL server may be an EAS or the AS. It may be further understood that, when a VAL has a capability of supporting a SEALDD service, the SEALDD enhancement layer architecture shown in FIG. 3 is used, so that the VAL can implement a function related to the SEALDD service. Specifically, during uplink transmission of user plane data, the VAL client first sends an application data packet to the SEALDD client. The SEALDD client encapsulates the data packet and sends an encapsulated data packet to the SEALDD server. The SEALDD server parses the data packet and then sends a parsed data packet to the VAL server. It may be understood that downlink transmission of the user plane data is also a similar procedure.

It should be noted that, when a data plane and a control plane are not distinguished, the AS and the AF may be used together or replaced by each other. In other words, the AS and the AF may be physically deployed on a same server. Alternatively, when a data plane and a control plane are distinguished, the AS and the AF are configured to perform different functions. For example, the AS in the 5GC may perform user plane data transmission with the UPF through the N6 interface. For another example, the AF in the 5GC may perform control-plane message communication with the PCF through the N5 interface or the N33 interface.

5. A Network Data Analytics Function (NWDAF) Network Element Collects Statistics On, Evaluates, and Predicts QoS, Service Experience, and the Like.

Currently, the NWDAF may collect running information of a network, for example, may collect statistics on, evaluate, and predict the QoS, the service experience, and the like of specified UE that uses a specific service in a specific area. In addition, the NWDAF may further send a result of the statistics, evaluation, and prediction to an AF, so that the AF selects a data network access identifier (DNAI).

Specifically, information that may be collected by the NWDAF may include but is not limited to one or more of the following:

(1) The NWDAF may collect, from the AF, a performance status that is of specified UE at a specific location in a specific time period when the UE is connected to an address of an APP server that is at a specific location and that is of a specific application. Performance data (performance data) information includes but is not limited to one or more of the following information: an average delay, an average packet loss rate, an average throughput, and the like. For example, the NWDAF may obtain corresponding performance data based on information such as a UE ID, a UE location, an application ID, a location of application, and an application server instance address.

(2) The NWDAF may collect, from an OAM, an air interface status of the specified UE in a specific cell at specific time, and the air interface status includes information such as reference signal received power (RSRP) and a signal to interference plus noise ratio (signal to interference plus noise ratio, SINR). For example, the NWDAF may obtain a corresponding air interface status based on information such as a UE ID, a UE location, a timestamp, and a cell ID.

(3) The NWDAF may collect, from an SMF and a UPF, a QFI to which a UE session belongs in a specific APP service (IP filter) corresponding to a specified DNAI, and information such as a rate, a data packet delay, and a data packet retransmission rate of the QFI. For example, the NWDAF may obtain the following information:

a. information, related to mobility management (MM), collected from an AMF, for example, information such as a UE location and a UE identifier;

b. SM-related information collected from the SMF, for example, single network slice selection assistance information (single network slice selection assistance information, S-NSSAI), application identifier (application ID) information, a DNAI, IP packet filtering information, and UPF information of a session service; and c. information, related to data packet measurement, collected from the UPF, for example, information such as a QoS flow packet bit rate, a QoS flow data packet delay, a quantity of data packet transmission times, and a quantity of data packet retransmissions.

(4) A granularity of service experience provided by the NWDAF may be determined as specific software (application ID), and a service (S-NSSAI) is obtained by a specific slice. When UE obtains a service in a specific area (area of interest, which is a TA granularity) based on a specific DNAI via the UPF, a corresponding service experience status of the UE for the service may be learned.

For example, for information collected by the NWDAF from the AF, the OAM, a 5GC, and the like, the NWDAF can expose information related to service experience to the AF. For example, the AF may subscribe to filtering information (for example, analytics filter information) of the service experience from the NWDAF, where the analytics filter information includes the application ID, the DNAI, the area of interest, and the like. The service experience information includes slice service experience information, application service experience information, and the like.

(5) The NWDAF may expose, to another network element or an external AF, a statistical value or a predicted value of service experience of performing an APP service by the UE by accessing the network at a specific location based on a DNAI. The statistical value or the predicted value may be used for DNAI selection.

Figure 4:
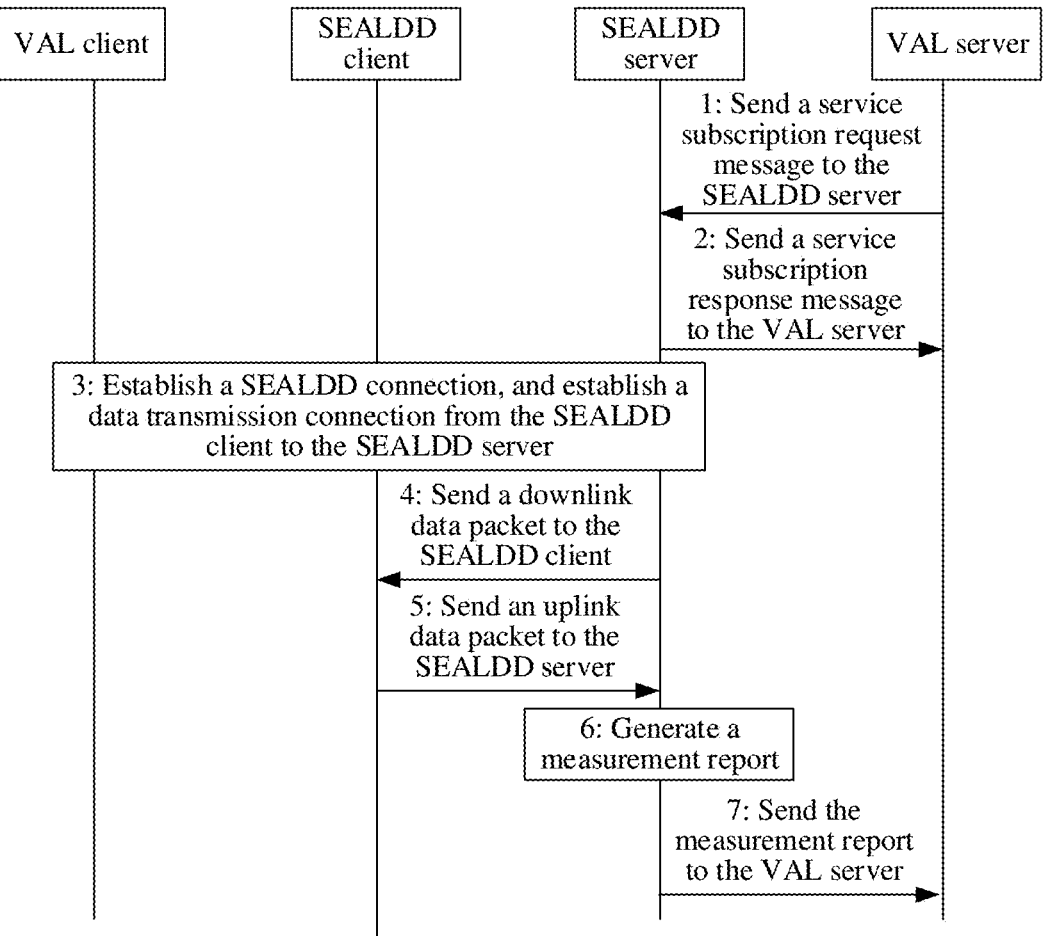
FIG. 4 is a schematic flowchart of QoS measurement.

6. QoS Measurement:

Currently, a SEALDD server and a SEALDD client may together provide end-to-end QoS measurement from UE to the SEALDD server. For example, FIG. 4 is a schematic flowchart of QoS measurement, where the QoS measurement is implemented through interaction among a VAL client, a SEALDD client, a SEALDD server, and a VAL server. The following steps are included.

Step 1: The VAL server sends a service subscription request message to the SEALDD server, where the service subscription request message is used to request a data transmission service. The service subscription request message may include requirement information for performing end-to-end QoS measurement, SEALDD connection information specified for performing QoS measurement, and the like.

Step 2: The SEALDD server sends a service subscription response message to the VAL server, where the service subscription response message is used to feed back a response.

Step 3: Establish a SEALDD connection, and establish a data transmission connection from the SEALDD client to the SEALDD server. It should be noted that step 3 is an optional condition. In another possible implementation, before step 1, a data transmission connection has been established between the SEALDD client and the SEALDD server.

Step 4: The SEALDD server sends a downlink data packet to the SEALDD client, and includes timestamp information in the downlink data packet (for example, in a packet header).

Step 5: The SEALDD client receives the downlink data packet sent by the SEALDD server, performs measurement, and records timestamp information of the SEALDD client. The SEALDD client sends an uplink data packet to the SEALDD server, where the uplink data packet carries receiving time of the downlink data packet and sending time of the uplink data packet.

Step 6: The SEALDD server may calculate a sending delay based on the uplink data packet sent by the SEALDD client, and may collect statistics on a packet loss rate, bandwidth information, and the like of the data packet, to generate a measurement report.

Step 7: The SEALDD server sends the measurement report to the VAL server.

Figure 5:
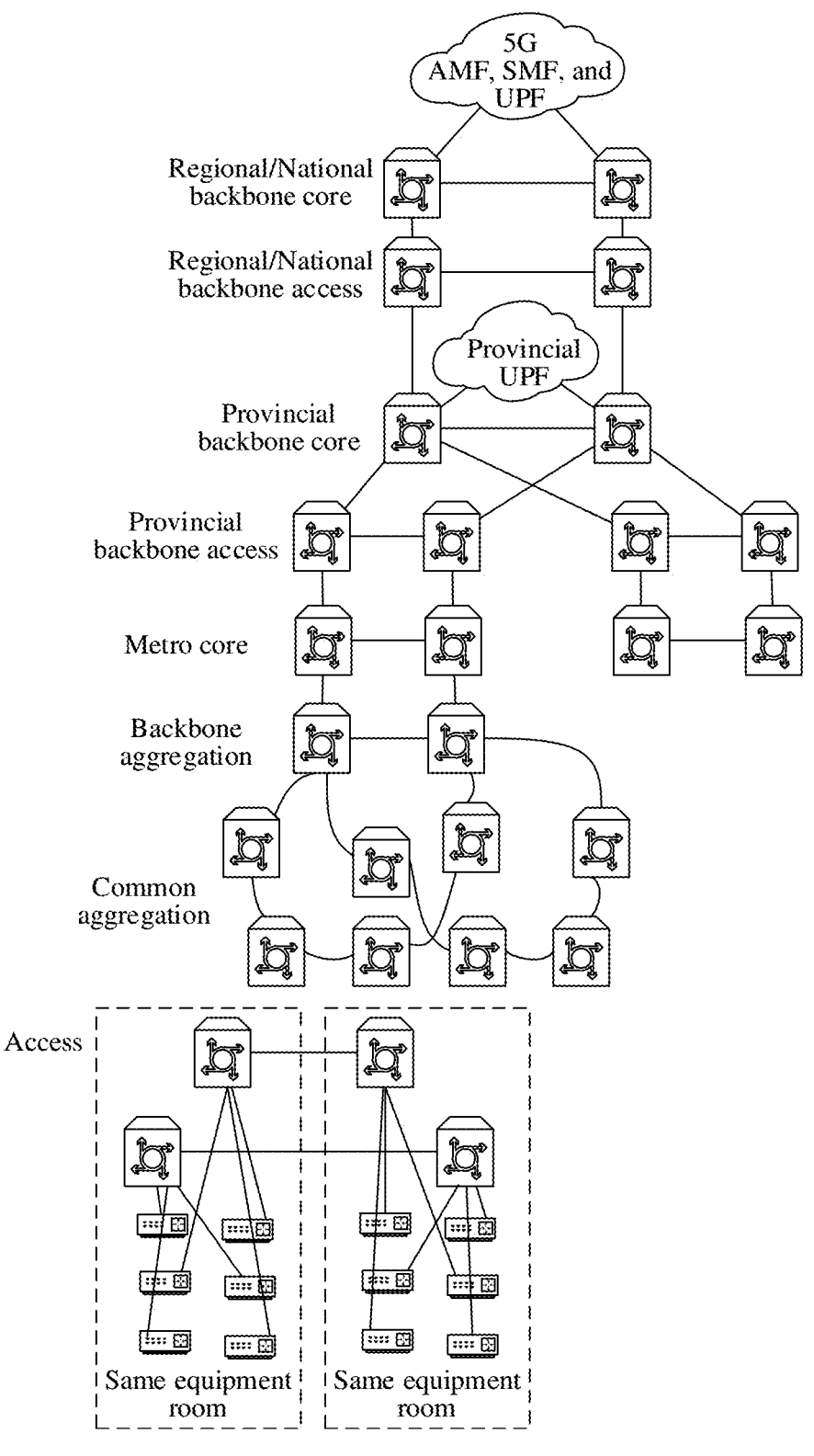
FIG. 5 is a diagram of core network deployment levels.

7. Core Network Deployment Levels:

For example, FIG. 5 is a diagram of core network deployment levels, where the deployment levels may be specifically classified into a metro core, a provincial backbone core, and a regional/national backbone core. Each level has an equipment room in which an independent UPF is deployed, and there may be different DNAIs for UPF selection. For example, different provinces each have an independent UPF, and independent UPFs may be connected to different data networks (DNS), so that the DNAIs are different. Further, specific deployment of a level below the metro core relates to RAN and access ring distribution. Each RAN node is connected to the access ring and connected to a core network via an aggregation ring. It can be learned that, through hierarchical deployment of the RAN node and a UPF node, the RAN may be connected to UPFs that are at different levels via the aggregation ring, for example, may be connected to an area level UPF, a provincial level UPF, or a regional level UPF. The UPFs that are at different levels are distinguished by the DNAIs. When the UE does not move, the RAN node does not change. The UE may access a network by changing a DNAI and switching to a UPF that is at a different level.

II. Communication Method Provided in this Application

Example 1: FIG. 6 is a schematic flowchart of a communication method according to this application. The communication method is applied to the communication system shown in FIG. 1. For example, the communication method may be performed by a transmission server (for example, a first transmission server), and includes the following steps.

S101: The first transmission server determines, based on first quality of service measurement information and/or first quality of service monitoring information, that the first transmission server is to be switched.

The first quality of service measurement information includes information about quality of service of serving by the first transmission server connected to a first transmission client via a first user plane function network element and a first access network device. The first transmission client is a terminal device (including a SEALDD client) served by the first transmission server. Specifically, the first quality of service measurement information includes information about quality of service obtained through measurement by a first SEALDD server, and/or analysis information from a network data analytics function network element. The information about the quality of service obtained through measurement by the first SEALDD server may include but is not limited to one or more of the following information: a delay, a throughput, a packet loss rate, and the like. Specifically, a SEALDD server may measure UE (or SEALDD client)-RAN-UPF-SEALDD server QoS information. For example, the first SEALDD server may perform measurement by using steps of the QoS measurement described in the foregoing section 6, to obtain the UE-RAN-UPF-SEALDD server QoS information (for example, obtain a delay, a throughput, a packet loss rate, and the like of the foregoing path through measurement). For the analysis information from the network data analytics function network element NWDAF, refer to the information that may be collected by the NWDAF and that is described in the foregoing section 5. For example, the NWDAF may collect, from the SEALDD server (for example, the first SEALDD server), a performance status (for example, including an average delay, an average packet loss rate, and an average throughput) that is of specified UE at a specific location in a specific time period when the UE is connected to an address of an APP server that is at a specific location and that is of a specific application. This is not limited in this application.

The first quality of service monitoring information includes a path between the first transmission client and the access network device, and/or a path between the first access network device and the first user plane function network element. Specifically, the first quality of service monitoring information may include QoS measurement information of the path (for example, information such as a delay, a throughput, and a packet loss rate of the path between the first transmission client and the access network device), or the first quality of service monitoring information is indication information indicating whether QoS information of the path exceeds a threshold (in other words, whether there is QoS abnormality). For example, in a current SA2 mechanism, an AF (namely, the SEALDD server in this application) may request QoS monitoring from a 5GC, to request to feed back UE-RAN QoS measurement information, RAN-UPF QoS measurement information, or UE-RAN-UPF QoS measurement information, or feed back whether UE-RAN QoS information, RAN-UPF QoS measurement information, or UE-RAN-UPF QoS measurement information exceeds the threshold (in other words, whether there is the QoS abnormality). For a specific implementation, refer to the descriptions of the QoS monitoring mechanism in the foregoing section 2. Details are not described herein again.

Specifically, S101 includes the following several cases.

Case 1: When the first transmission server determines, based on the first quality of service measurement information, that the quality of service of serving by the first transmission server connected to the first transmission client via the first user plane function network element and the first access network device does not satisfy a quality of service requirement of an application layer application, the first transmission server determines that the first transmission server is to be switched. In other words, the first transmission server may determine, based on the first quality of service measurement information, whether the first transmission server is to be switched.

For example, when the first quality of service measurement information includes QoS information obtained by the first SEALDD server by measuring a UE-RAN-UPF-SEALDD server path, and the first SEALDD server determines that the QoS information does not satisfy the quality of service requirement of the application layer application, the first SEALDD server determines that quality of service of a data flow deteriorates.

Satisfying the quality of service requirement of the application layer application described in this application may be specifically satisfying a quality of service requirement of a VAL application, for example, including the following content.

a. A QoS requirement received from a VAL server, namely, a QoS optimization or guarantee service (including the QoS requirement) requested by the VAL server to the SEALDD server, is satisfied. For example, a first VAL server may send a QoS request message to the first SEALDD server, where the QoS request message includes the QoS requirement, and/or information about an available VAL server (when the QoS requirement is not satisfied, the SEALDD server is to be switched, and a network may also reselect a target VAL server from the available VAL server, to satisfy the QoS requirement).

b. A QoS requirement obtained by the SEALDD server through calculation based on a service type (API type information) subscribed by the VAL or parameters carried in subscription is satisfied.

Optionally, the quality of service requirement of the application layer application may include but is not limited to one or more of the following requirements: a delay requirement (for example, when a delay is less than a preset delay threshold, it is considered that the QoS requirement is satisfied; or when a delay is greater than or equal to a preset delay threshold, the QoS requirement is not satisfied), a packet loss rate requirement (for example, when a packet loss rate is less than a preset packet loss rate threshold, it is considered that the QoS requirement is satisfied; or when a packet loss rate is greater than or equal to a preset packet loss rate threshold, the QoS requirement is not satisfied), a throughput requirement (for example, when a throughput is greater than a preset throughput threshold, it is considered that the QoS requirement is satisfied; or when a throughput is less than or equal to a preset throughput threshold, the QoS requirement is not satisfied), and the like.

Case 2: When the quality of service of serving by the first transmission server connected to the first transmission client via the first user plane function network element and the first access network device does not satisfy a quality of service requirement of an application layer application, and quality of service of the path between the first transmission client and the first access network device satisfies a quality of service requirement of a first path, the first transmission server determines that the first transmission server is to be switched. Alternatively, when the quality of service of serving by the first transmission server connected to the first transmission client via the first user plane function network element and the first access network device does not satisfy a quality of service requirement of an application layer application, and quality of service of the path between the first transmission client and the first access network device satisfies a quality of service requirement of a first path, the first transmission server determines to perform switching. In other words, the first transmission server needs to comprehensively consider the first quality of service measurement information and the first quality of service monitoring information to determine whether the first transmission server is to be switched. The quality of service requirement of the first path is a requirement parameter value for determining whether there is a fault between the UE and the RAN. The quality of service requirement of the first path may be provided by the SEALDD server, may be determined by a core network device (for example, a PCF) based on QoS requirements, or may be determined by a core network device (for example, a PCF) based on a configuration of the core network device. This is not limited in this application.

For example, when the UE-RAN QoS measurement information is normal but quality of service of a data flow deteriorates, a possible cause is that UE-RAN is normal but a RAN-UPF-SEALDD server side is abnormal, or a UE-RAN-UPF side is normal but an N6 path, SEALDD server load, or the like is abnormal. The foregoing two abnormalities may be resolved by switching the SEALDD server. For example, when the UE-RAN-UPF side is normal but the N6 path, the SEALDD server load, or the like is abnormal (for example, poor data transmission quality is caused by overload of a SEALDD server or a VAL server in an equipment room), the RAN and the UPF may remain unchanged, and the SEALDD server and/or the VAL server may be switched to improve quality of service. For another example, when the UE-RAN is normal but the RAN-UPF-SEALDD server side is abnormal (for example, poor data transmission quality is caused by congestion generated due to overload of the UPF or overload of an N3 path), the RAN may remain unchanged, and the UPF and the corresponding SEALDD server and VAL server are switched to improve quality of service.

Optionally, that the quality of service of the path between the first transmission client and the first access network device satisfies the quality of service requirement of the first path may also be expressed as: Transmission on the path between the first transmission client and the first access network device is normal. For example, when the quality of service of the path between the first transmission client and the first access network device satisfies the quality of service requirement of the first path, there are the following two cases.

a. The first transmission server receives no feedback of abnormality between the UE and the RAN. For example, UE-RAN QoS information does not exceed a threshold. Therefore, no abnormality information is reported by the core network device. Correspondingly, no abnormality information is received by the SEALDD server.

b. The first transmission server receives normal QoS information. For example, the SEALDD server receives the QoS information, and determines, based on the QoS information, that UE-RAN QoS information does not exceed a threshold. In other words, the SEALDD server receives normal QoS information.

S102: The first transmission server determines a second transmission server.

Quality of service of serving by the second transmission server connected to the first transmission client via the first access network device and a second user plane function network element satisfies the quality of service requirement of the application layer application. In other words, when the first transmission server cannot satisfy the QoS requirement, the first transmission server may select another transmission server (for example, the second transmission server), and perform service switching to the second transmission server, so that the first transmission client is served by the second transmission server.

Specifically, that the first transmission server determines a second transmission server includes the following cases.

Case 1: When the UE-RAN-UPF side is normal but overall QoS deteriorates, it can be inferred that the deterioration is caused by abnormality of the N6 path, the SEALDD server load, or the like (for example, the poor data transmission quality is caused by overload of the SEALDD server or the VAL server in the equipment room). In this case, the RAN and the UPF may remain unchanged, and the SEALDD server and/or the VAL server may be switched. Optionally, before selecting the second transmission server, the first transmission server may obtain, in advance, one or more of load information and traffic information of an available target transmission server, and determine, based on the load information and the traffic information of the available target transmission server, the second transmission server that satisfies a service requirement. In this case, the first transmission server and the second transmission server have a same DNAI. Optionally, when the QoS deterioration occurs but UE-RAN-UPF transmission is normal, the first transmission server may also obtain one or more of the load information and the traffic information of the available target transmission server, and determine, based on the load information and the traffic information of the available target transmission server, the second transmission server that satisfies the service requirement.

Case 2: When UE-RAN is normal but overall QoS deteriorates, it can be inferred that the deterioration is caused by abnormality on the RAN-UPF-SEALDD server side (for example, the poor data transmission quality is caused by congestion generated due to the overload of the UPF or the overload of the N3 path). In this case, the RAN may remain unchanged, and the UPF and the corresponding SEALDD server and VAL server are switched. Optionally, before selecting the second transmission server, the first transmission server may obtain, in advance, information about quality of service of using the available target transmission server at a first location, and determine, based on information about quality of service of the available target transmission server, the second transmission server that satisfies a service requirement. In this case, the first transmission server and the second transmission server have different DNAIs or a same DNAI.

Optionally, when the first transmission server performs service switching to the second transmission server, a connection relationship between the devices may include the following cases.

Case 1: The terminal device is connected to the first access network device, the first access network device is connected to the first user plane function network element, and the first user plane function network element is connected to the second transmission server (UE-RAN 1-UPF 1-SEALDD server 2). In other words, only the first transmission server is replaced and a connection relationship between other devices remains unchanged, to continue to provide a VAL service for the terminal device. In Case 1, the second user plane function network element and the first user plane function network element are same network elements.

Case 2: The terminal device is connected to the first access network device, the first access network device is connected to the second user plane function network element, and the second user plane function network element is connected to the second transmission server (UE-RAN 1-UPF 2-SEALDD server 2). In other words, the first transmission server and the first user plane function network element are replaced and a connection relationship between other devices remains unchanged, to continue to provide a VAL service for the terminal. In Case 2, the second user plane function network element and the first user plane function network element are different network elements.

Case 3: The terminal device is connected to a second access network device, the second access network device is connected to the second user plane function network element, and the second user plane function network element is connected to the second transmission server (UE-RAN 2-UPF 2-SEALDD server 2). In other words, the first transmission server, the first user plane function network element, and the first access network device are replaced, to continue to provide a VAL service for the terminal. In Case 3, the second user plane function network element and the first user plane function network element are different network elements.

In this example, the first transmission server may determine, based on QoS information obtained through measurement and QoS information that is between the UE and the RAN, between the RAN and the UPF, or between the UE, the RAN, and the UPF and that is obtained through 5GC monitoring, whether the first transmission server is to be switched. If the switching is needed, the first transmission server may determine the second transmission server that satisfies the QoS requirement, so that the first transmission server can be switched to the second transmission server. This helps QoS guarantee.

The following further describes Example 1 by using two specific examples, including an interaction procedure between the SEALDD server and the 5GC, the RAN, and the SEALDD client.

Example 2: FIG. 7 is a schematic flowchart of another communication method according to this application. For example, the communication method may be implemented through interaction between a SEALDD server (for example, including a first transmission server and a second transmission server), a VAL server (for example, including a first application layer server and a second application layer server), a 5GC, and a SEALDD client (for example, including a first transmission client), and includes the following steps.

S201: The first transmission server determines a quality of service requirement of an application layer application and information about an available target application layer server.

A manner in which the first transmission server determines the quality of service requirement of the application layer application may include but is not limited to the following manners.

Manner 1: The first application layer server directly sends the quality of service requirement of the application layer application to the first transmission server. Correspondingly, the first transmission server receives the quality of service requirement of the application layer application from the first application layer server. For example, a first VAL server sends a QoS request message (for example, QoS requirement subscription) to a first SEALDD server, where the QoS request message includes a QoS requirement and information about an available target application layer server (available target VAL server) (for example, identification information and location information of the available target VAL server).

Manner 2: The first transmission server obtains the quality of service requirement of the application layer application through calculation. For example, the first application layer server does not directly send the quality of service requirement of the application layer application to the first transmission server, but includes an API type or another related parameter in a sent request message. In this way, the first transmission server may obtain the quality of service requirement of the application layer application based on the API type or the another related parameter in the request message through calculation.

Determining (also referred to as obtaining) the information about the available target application layer server by the first transmission server may be specifically receiving the information about the target application layer server from the first application layer server.

Optionally, after S201, the method further includes the following steps.

(1) The first transmission client establishes a connection with the first transmission server, and the first transmission server may obtain address information and location information of a current terminal device (including the first transmission client).

(2) The first transmission server determines information about an available target transmission server based on the information about the available target application layer server. The information about the available target transmission server may include but is not limited to at least one of the following information: an identifier of a transmission server, an identifier of an application service, an address of the transmission server, an address of the application service, and the like. For example, the first SEALDD server may find information about an available SEALDD server (for example, including information about one or more SEALDD servers) via a common API framework (Common API (application programming interface) framework, CAPIF) or an edge enable layer (EEL), and may obtain the information about the available target transmission server through querying the information about the available SEALDD server by using information about a target VAL server (VAL server 2) or VAL server ID information (or VAL service information) as an index. The first transmission server determines the available target transmission server based on the information about the available target application layer server. The available target transmission server includes one or more transmission servers (for example, includes the second transmission server). In this example, the available target transmission server is a transmission server having a same DNAI. In other words, the available target transmission server and the first transmission server access a same data network and are also connected to a same UPF.

S202: The first transmission server sends a first message to the available target transmission server, where the first message is used to obtain at least one of traffic information and load information of the available target transmission server.

For example, the first transmission server sends the first message to the second transmission server, to obtain at least one of traffic information and load information of the second transmission server. The traffic information of the available target transmission server includes information such as a bandwidth of an N6 path corresponding to the available target transmission server, for example, includes a bandwidth of the N6 path between the UPF 1 and the SEALDD server 2 shown in FIG. 1. The load information of the available target transmission server includes a usage status of a processing resource (for example, a computing resource) of the available target transmission server, for example, includes a usage status of a computing resource of the SEALDD server 2 shown in FIG. 1.

For example, the first message includes the information about the target VAL server (VAL server 2) or the VAL server ID information (or the VAL service information), and the first transmission server may obtain at least one of traffic information and load information of a corresponding target SEALDD server based on the foregoing information.

Optionally, a precondition for a case in which the first transmission server sends the first message to the available target transmission server may be: Quality of service of serving by the first transmission server connected to the first transmission client via a first user plane function network element and a first access network device does not satisfy the quality of service requirement of the application layer application, and quality of service of a first transmission client— first access network device—first user plane function network element path satisfies a quality of service requirement of a second path. For example, the first transmission server may determine, based on first quality of service measurement information, that quality of service is abnormal (the quality of service requirement of the application layer application is not satisfied), but UE-RAN-UPF in first quality of service monitoring information is normal (the quality of service requirement of the second path is satisfied). In this case, the first transmission server may determine, based on the load information and the traffic information, the second transmission server that may be selected, and the first transmission server may send the first message to the second transmission server, to obtain at least one of the traffic information and the load information of the second transmission server.

Optionally, after S202, the method further includes the following steps.

(3) After the available target transmission server receives the first message from the first transmission server, authorization check is performed to determine whether the target transmission server is available.

(4) An available target transmission server that passes the authorization check sends a first response message to the first transmission server based on an authorization check status.

For specific implementations of the foregoing steps (3) and (4), refer to descriptions in an existing protocol standard. This is not limited in this application.

S203: The first transmission server sends a fourth message to a core network device, where the fourth message is used to obtain the first quality of service monitoring information.

For descriptions of the first quality of service monitoring information, refer to the corresponding descriptions in Example 1. Details are not described herein again. For example, the first SEALDD server subscribes to a QoS monitoring notification from the 5GC. The first SEALDD server may perform subscription via a network element such as an NRM server or a NEF. The QoS monitoring notification includes a SEALDD traffic descriptor and the QoS requirement. Optionally, the fourth message may be used to subscribe to traffic information of an N3 path, for example, obtain traffic information of the N3 path between the RAN and the UPF 1 shown in FIG. 1. Optionally, the QoS requirement in S203 may be different from the QoS requirement sent by the VAL server 1 in S201. Specifically, formats or indicators of the QoS requirements may be different.

Optionally, after S203, the method further includes the following steps.

(5) The first transmission server and the first transmission client perform QoS measurement on SEALDD traffic transmission.

For a specific implementation of step (5), refer to the descriptions of the QoS measurement in the foregoing section 6. Details are not described herein again.

Optionally, an execution sequence of the foregoing S202 and S203 is not limited in this application. For example, S202 may be performed first, and then S203 is performed. For another example, S203 may be performed first, and then S202 is performed.

S204: The first transmission server determines, based on the first quality of service measurement information, that the quality of service of serving by the first transmission server connected to the first transmission client via the first user plane function network element and the first access network device does not satisfy the quality of service requirement of the application layer application.

For a specific implementation of S204, refer to the corresponding descriptions in Example 1. Details are not described herein again.

Optionally, an execution sequence of the foregoing S202, S203, and S204 is not limited in this application. For example, S202 and S203 may be performed first, and then S204 is performed. For another example, S204 may be performed first, and then S202 and S203 are performed (in this way, that a request message for performing QoS monitoring is continuously sent to the 5GC can be avoided; instead, a target SEALDD server is found and QoS monitoring is performed only after QoS deterioration occurs).

S205: The first transmission server obtains at least one of the traffic information and the load information of the available target transmission server.

For example, the first transmission server receives the traffic information and the load information from the second transmission server, where the traffic information and the load information may include a current load status and a total traffic transmission load status of the second transmission server (for example, include data flow load statuses of all services of the entire second transmission server). The second transmission server is one of the available target transmission server.

S206: The first transmission server determines, based on at least one of the traffic information and the load information of the available target transmission server, the second transmission server that satisfies the quality of service requirement of the application layer application.

For example, if the first SEALDD server determines, based on QoS monitoring information, that no abnormality occurs between the UE, the RAN, and the UPF, it indicates that transmission quality deterioration is caused by an abnormal working status of the first SEALDD server and/or abnormal transmission over the N6 interface. For the purpose of QoS guarantee, the first SEALDD server may select, from the available target transmission server based on load and traffic statuses of the available target transmission server, the second transmission server that can satisfy the quality of service requirement of the application.

Optionally, after S206, the method further includes the following steps.

(6) Migration from the first transmission server to the second transmission server is performed.

For example, a SEALDD service is migrated from the first transmission server to the second transmission server, and the VAL server also changes from the first application layer server corresponding to the first transmission server to the second application layer server corresponding to the second transmission server. For a specific implementation, refer to descriptions in an existing protocol standard. Details are not described herein again.

In this example, the SEALDD server subscribes to both a QoS monitoring result of the 5GC and load information and/or traffic information of another SEALDD server having a same DNAI. If the SEALDD server detects that current QoS measurement deteriorates and determines, based on the QoS monitoring information, that no abnormality occurs among the UE, the RAN, and the UPF, the SEALDD server may perform QoS guarantee by switching to the another SEALDD server having the same DNAI.

Figure 8:
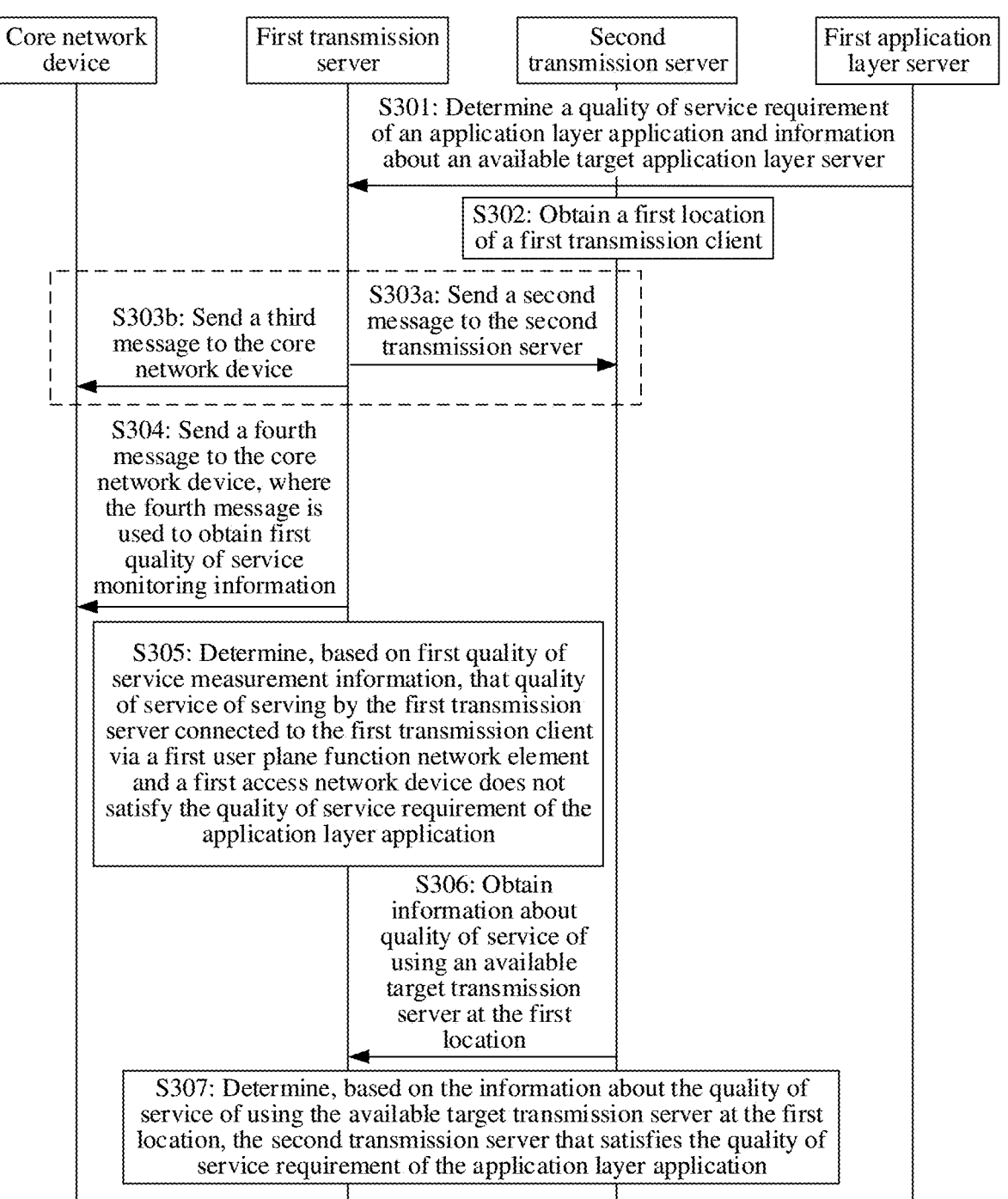
FIG. 8 is a schematic flowchart of still another communication method according to this application.

Example 3: FIG. 8 is a schematic flowchart of still another communication method according to this application. For example, the communication method may be implemented through interaction between a SEALDD server (for example, including a first transmission server and a second transmission server), a VAL server (for example, including a first application layer server), a 5GC, and a SEALDD client (for example, including a first transmission client), and includes the following steps.

S301: The first transmission server determines a quality of service requirement of an application layer application and information about an available target application layer server.

A manner in which the first transmission server determines the quality of service requirement of the application layer application may include but is not limited to the following manners.

Manner 1: The first application layer server directly sends the quality of service requirement of the application layer application to the first transmission server. Correspondingly, the first transmission server receives the quality of service requirement of the application layer application from the first application layer server. For example, a first VAL server sends a QoS request message (for example, QoS requirement subscription) to a first SEALDD server, where the QoS request message includes a QoS requirement and information about an available target application layer server (available target VAL server) (for example, identification information and location information of the available target VAL server).

Manner 2: The first transmission server obtains the quality of service requirement of the application layer application through calculation. For example, the first application layer server does not directly send the quality of service requirement of the application layer application to the first transmission server, but includes an API type or another related parameter in a sent request message. In this way, the first transmission server may obtain the quality of service requirement of the application layer application through calculation based on the API type or the another related parameter in the request message.

Determining (also referred to as obtaining) the information about the available target application layer server by the first transmission server may be specifically receiving the information about the target application layer server from the first application layer server.

Optionally, after S301, the method further includes the following steps.

(1) The first transmission client establishes a connection with the first transmission server, and the first transmission server may obtain address information and location information of a current terminal device (including the first transmission client).

(2) The first transmission server obtains information about an available target transmission server based on the information about the available target application layer server. For example, the first SEALDD server may find information about an available SEALDD server (for example, including information about one or more SEALDD servers) via a common API framework (Common API (application programming interface) framework, CAPIF) or EEL, and may obtain the information about the available target transmission server through querying the information about the available SEALDD server by using information about a target VAL server (VAL server 2) or VAL server ID information (or VAL service information) as an index. The first transmission server determines the available target transmission server based on the information about the available target application layer server. The available target transmission server includes one or more transmission servers (for example, includes the second transmission server). In this example, the available target transmission server may be a transmission server having a different DNAI. In other words, the available target transmission server and the first transmission server access different data networks and are connected to different UPFs. Optionally, when selecting a different DNAI, the first transmission server further needs to consider a level of a physical location (topology connection) represented by the DNAI. Optionally, in this example, the available target transmission server may alternatively be a transmission server having a same DNAI. In other words, the available target transmission server and the first transmission server access a same data network and are connected to a same UPF.

S302: The first transmission server obtains a first location of the first transmission client.

The first location includes a location area in which the first transmission client served by the first transmission server is located. For example, the first location includes the area of interest 1 shown in FIG. 1. Optionally, the first location may be information such as a geographical location, a geographical area, a cell identifier, or a DNAI of the UE. This is not limited in this application.

In Example 3, the first transmission server may request to obtain information about quality of service of the available target transmission server from different devices. For example, the following cases are included.

Case 1: As shown in S303*a*, the first transmission server requests to obtain the information about the quality of service of the available target transmission server from the available target transmission server.

S303*a*: The first transmission server sends a second message to the available target transmission server, where the second message includes the first location and/or the information about the available target application layer server.

For example, the first transmission server sends the second message to the second transmission server, where the second message includes the first location and/or the information about the available target application layer server. In other words, after determining the available target transmission server and obtaining the first location, the first transmission server may send the second message to the available target transmission server. The second message is used to obtain information about quality of service of using the available target transmission server at the first location. For example, the first SEALDD server sends the second message to a second SEALDD server, where the second message is used to subscribe to a QoS measurement notification. The second message includes the information about the target VAL server or information related to a VAL service, and further includes the first location (for example, UE location information). For another example, the first SEALDD server sends a request message to the second SEALDD server, where the request message is used to request to obtain the information about the quality of service of using the available target transmission server at the first location. Correspondingly, the second SEALDD server sends a response message to the first SEALDD server, where the response message includes the information about the quality of service of using the available target transmission server at the first location.

Case 2: As shown in S303*b*, the first transmission server requests to obtain the information about the quality of service of the available target transmission server from a core network device 5GC.

S303*b*: The first transmission server sends a third message to a core network device, where the third message includes one or more of the following information: the first location, the information about the available target transmission server, or a data network access identifier associated with the available target transmission server.

The third message is used to obtain information about quality of service of using the available target transmission server at the first location. Optionally, the core network device is an NWDAF. For example, the first SEALDD server subscribes to a QoS measurement notification from the NWDAF, where the QoS measurement notification includes the information about the target VAL server or information related to a VAL service, and further includes the first location (for example, UE location information) and a target DNAI.

Optionally, the information about the quality of service obtained in S303*a* and S303*b* may be specifically information about quality of service of an end-to-end link. For example, information about quality of service of an end-to-end link: UE (SEALDD client)-RAN-UPF-SEALDD server is obtained.

It may be understood that S303*a* and S303*b* are two possible implementations of one step, and only one of the two steps needs to be selected for execution during specific implementation.

Optionally, after S303*a* or S303*b*, the method further includes the following steps.

(3) After the available target transmission server receives the second message from the first transmission server, authorization check is performed to determine whether the target transmission server is available.

(4) An available target transmission server that passes the authorization check sends a second response message to the first transmission server based on an authorization check status.

For specific implementations of the foregoing steps (3) and (4), refer to descriptions in an existing protocol standard. This is not limited in this application.

S304: The first transmission server sends a fourth message to a core network device, where the fourth message is used to obtain first quality of service monitoring information.

For a specific implementation of S304, refer to the descriptions in S203. Details are not described herein again.

Optionally, after S304, the method further includes the following steps.

(5) The first transmission server and the first transmission client perform QoS measurement on SEALDD traffic transmission.

For a specific implementation of step (5), refer to the descriptions of the QoS measurement in the foregoing section 6. Details are not described herein again.

S305: The first transmission server determines, based on the first quality of service measurement information, that quality of service of serving by the first transmission server connected to the first transmission client via a first user plane function network element and a first access network device does not satisfy the quality of service requirement of the application layer application.

For a specific implementation of S305, refer to the corresponding descriptions in Example 1. Details are not described herein again.

Optionally, an execution sequence of the foregoing S303*a*/S303*b* and S304 and S305 is not limited in this application. For example, S303*a*/S303*b* and S304 may be performed first, and then S305 is performed. For another example, S305 may be performed first, and then S303*a*/S303*b* and S304 are performed (in this way, that a request message for performing QoS monitoring is continuously sent to the 5GC can be avoided; instead, a target SEALDD server is found and QoS monitoring is performed only after QoS deterioration occurs).

S306: The first transmission server obtains the information about the quality of service of using the available target transmission server at the first location.

For example, the first transmission server receives a QoS measurement report from the second transmission server. Specifically, the QoS measurement report may be specific information about QoS of serving UE, in a first area, by the second transmission server for the second application layer server (specific VAL service). Optionally, the information about the quality of service further includes a load status and a total traffic transmission load status of the second SEALDD server (for example, includes data flow load statuses of all services of the entire second transmission server). The second transmission server is one of the available target transmission server.

S307: The first transmission server determines, based on the information about the quality of service of using the available target transmission server at the first location, the second transmission server that satisfies the quality of service requirement of the application layer application.

For example, the first SEALDD server receives no QoS monitoring report of the 5GC, and it may be determined that data transmission on a RAN side is normal. This indicates that transmission quality deterioration is caused by at least one of the following abnormality: an abnormal working status of the first SEALDD server, abnormal working of RAN-UPF, and abnormal working of UPF-SEALDD server. For the purpose of QoS guarantee, the first SEALDD server may determine the second transmission server based on the information about the quality of service of using the available target transmission server at the first location.

Optionally, after S307, the method further includes the following steps.

(6) Migration from the first transmission server to the second transmission server is performed.

For example, a SEALDD service is migrated from the first transmission server to the second transmission server, and the VAL server also changes from the first application layer server corresponding to the first transmission server to the second application layer server corresponding to the second transmission server. For a specific implementation, refer to descriptions in an existing protocol standard. Details are not described herein again.

In this example, the SEALDD server subscribes to both the QoS monitoring result of the 5GC and results of QoS measurement, for a specific UE location, performed by SEALDD servers (for example, SEALDD servers having different DNAIs). If the SEALDD server detects that the current QoS measurement deteriorates but receives no QoS monitoring result deterioration notification sent by the 5GC, the SEALDD server may perform cross-DNAI SEALDD server switching for QoS guarantee.

Optionally, corresponding steps may be separately performed in Example 2 and Example 3, or Example 2 and Example 3 may be combined into one example to perform corresponding steps. For example, the first transmission server may obtain both information about quality of service corresponding to a same DNAI and information about quality of service corresponding to different DNAIs, to help determine whether to perform switching between SEALDD servers having the same DNAI or the different DNAIs, for QoS guarantee.

Example 4: FIG. 9 is a schematic flowchart of yet another communication method according to this application. The communication method is applied to the communication system shown in FIG. 1. For example, the communication method may be implemented through interaction between a transmission server (SEALDD server), an application layer server (VAL server), a 5GC, and a transmission client (SEALDD client), and includes the following steps.

S401: The transmission server obtains a first quality of service requirement.

A manner in which the transmission server obtains the first quality of service requirement may include but is not limited to the following manners.

Manner 1: The application layer server directly sends the first quality of service requirement to the transmission server. Correspondingly, the transmission server may receive the first quality of service requirement from the application layer server. For example, a first VAL server may send a QoS request message to a first SEALDD server, where the QoS request message includes a QoS requirement used to request a QoS optimization or guarantee service.

Manner 2: The transmission server obtains the first quality of service requirement through calculation. For example, the application layer server does not directly send the first quality of service requirement to the transmission server, but includes an API type or another related parameter in a sent request message. In this way, the transmission server may obtain the first quality of service requirement through calculation based on the API type or the another related parameter in the request message. For descriptions of the quality of service requirement, refer to the corresponding descriptions in S101. Details are not described herein again.

Optionally, after S401, the method further includes the following steps.

(1) The transmission client establishes a connection with the transmission server, and the transmission server may obtain address information and location information of a current terminal device (including the transmission client).

For a specific implementation of the foregoing step (1), refer to corresponding descriptions in an existing protocol standard. This is not limited in this application.

S402: The transmission server obtains information about quality of service of using a service of the transmission server by the terminal device at a second location.

The information about the quality of service of using the service of the transmission server by the terminal device at the second location may also be referred to as predicted information about quality of service. The second location is a specific location area. For example, the second location is a location area in which the terminal device is located, and the location area may be a location area of the terminal device determined based on identification information of the terminal device. For specific descriptions of the information about the quality of service, refer to the corresponding descriptions in Example 1. Details are not described herein again.

Specifically, S402 includes the following procedure.

The transmission server sends a fifth message to an NWDAF, where the fifth message is used to obtain the information about the quality of service based on information about the terminal device and service information of the transmission server.

The transmission server receives the information about the quality of service from the NWDAF.

For example, the transmission server sends the fifth message to the NWDAF, where the fifth message includes the information (for example, a UE ID) about the terminal device, information about the SEALDD server, information related to an SEALDD service, or the like. In this way, the NWDAF can obtain, based on the foregoing information, the information about the quality of service of using the service of the transmission server by the terminal device at the second location. The NWDAF sends a fifth response message to the transmission server, where the fifth response message includes the information about the quality of service.

Optionally, a manner in which the transmission server sends the fifth message to the NWDAF may include but is not limited to: The transmission server sends the fifth message to the NWDAF via an NEF, or the transmission server directly sends the fifth message to the NWDAF.

S403: The transmission server determines a second quality of service requirement of the terminal device based on the first quality of service requirement and the information about the quality of service.

The second quality of service requirement includes a set of one or more quality of service parameters. For example, the SEALDD server calculates, based on a first QoS requirement of the VAL server and service experience information fed back by the NWDAF, the second QoS requirement that the UE should have. The second quality of service requirement may be a combination of multiple-level QoS requirements. For example, the second quality of service requirement includes a combination of a bandwidth requirement and a delay requirement. In other words, satisfying the second quality of service requirement includes satisfying the bandwidth requirement and the delay requirement. Optionally, the second QoS requirement includes an adjustable alternative alternative QoS requirement. For example, the second quality of service requirement includes any combination of a plurality of bandwidth requirements and a plurality of delay requirements.

Optionally, the SEALDD server may further interact with the VAL server to determine whether the second QoS requirement satisfies a service requirement of the VAL server. If the second QoS requirement satisfies the service requirement of the VAL server, a service procedure continues to be performed; or if the second QoS requirement does not satisfy the service requirement of the VAL server, a service is released.

Optionally, after S403, the method further includes the following steps.

(2) The transmission server sends a request message to a core network device, where the request message is used to request the core network device to provide guarantee of the second quality of service requirement.

The core network device is a NEF or a PCF. For example, the transmission server may send an AF request to the PCF, where the AF request includes the second quality of service requirement. The second quality of service requirement may be a specified parameter (for example, a combination of a specified bandwidth requirement and a specified delay requirement), or may be an adjustable alternative alternative QoS requirement (for example, including any combination of a plurality of bandwidth requirements and a plurality of delay requirements). Optionally, a set of the plurality of quality of service parameters includes a QoS requirement parameter and other optional QoS requirement parameters, where the other optional QoS requirement parameters have a priority sequence.

(3) The core network device maintains alternative QoS.

For a specific implementation of step (3), refer to the descriptions of the alternative QoS requirement in the foregoing section 1. Details are not described herein again.

In this example, after receiving the first quality of service requirement of the VAL server, the transmission server may determine the second quality of service requirement based on the information about the quality of service and the first quality of service requirement, to perform QoS guarantee for the UE.

To implement functions in the methods provided in this application, the apparatus or device provided in this application may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on a specific application and design constraints of the technical solutions. Module division in this application is an example, and is merely logical function division. In actual implementation, there may be another division manner. In addition, functional modules in embodiments of this application may be integrated into one processor, or may exist alone physically, or two or more modules may be integrated into one module. The integrated module may be implemented in a form of hardware, or may be implemented in a form of a software functional module.

FIG. 10 is a diagram of a communication apparatus according to this application. The apparatus may include modules in one-to-one correspondence with the methods/operations/steps/actions described in any embodiment shown in FIG. 6 to FIG. 9. The modules may be hardware circuits, may be software, or may be implemented by hardware circuits in combination with software.

An apparatus 1000 includes a processing unit 1001 and a communication unit 1002, configured to implement the methods performed by the devices in the foregoing embodiments.

In a possible implementation, the apparatus is a transmission server, or is located in a transmission server. Specifically, the processing unit 1001 is configured to determine, based on first quality of service measurement information and/or first quality of service monitoring information, that the first transmission server is to be switched. The first quality of service measurement information includes information about quality of service of serving by the first transmission server connected to a first transmission client via a first user plane function network element and a first access network device. The first quality of service monitoring information includes information about quality of service of a path between the first transmission client and the first access network device and/or information about quality of service of a path between the first access network device and the first user plane function network element. The processing unit 1001 is further configured to determine a second transmission server, where quality of service of serving by the second transmission server connected to the first transmission client via the first access network device and a second user plane function network element satisfies a quality of service requirement of an application layer application.

Optionally, that the processing unit 1001 is configured to determine, based on first quality of service measurement information and/or first quality of service monitoring information, that the first transmission server is to be switched includes:

When determining, based on the first quality of service measurement information, that the quality of service of serving by the first transmission server connected to the first transmission client via the first user plane function network element and the first access network device does not satisfy the quality of service requirement of the application layer application, and/or the quality of service of the path between the first transmission client and the first access network device satisfies a quality of service requirement of a first path, the processor 1102 determines that the first transmission server is to be switched.

Optionally, the communication unit 1002 is configured to receive information about an available target application layer server from a first application layer server, where the information about the available target application layer server is used to determine an available target transmission server, and the available target transmission server and the first transmission server access a same data network.

The communication unit 1002 is further configured to send a first message to the available target transmission server, where the first message is used to obtain at least one of traffic information and load information of the available target transmission server.

The available target transmission server includes one or more transmission servers.

Optionally, that the processing unit 1001 is configured to determine a second transmission server includes:

The processor 1102 determines the quality of service requirement of the application layer application.

The processing unit 1001 obtains at least one of the traffic information and the load information of the available target transmission server via the communication unit 1002.

The processor 1102 determines, based on at least one of the traffic information and the load information of the available target transmission server, the second transmission server that satisfies the quality of service requirement of the application layer application, where the second transmission server is one of the available target transmission server.

Optionally, the communication unit 1002 is further configured to receive information about an available target application layer server from a first application layer server, where the information about the available target application layer server is used to determine information about an available target transmission server.

The communication unit 1002 is further configured to obtain a first location of the first transmission client.

The communication unit 1002 is further configured to send a second message to the available target transmission server, where the second message includes the first location and/or the information about the available target application layer server.

Optionally, the communication unit 1002 is further configured to receive information about an available target application layer server from a first application layer server, where the information about the available target application layer server is used to determine information about an available target transmission server.

The communication unit 1002 is further configured to obtain a first location of the first transmission client.

The communication unit 1002 is further configured to send a third message to a core network device, where the third message includes one or more of the following information: the first location, the information about the available target transmission server, or a data network access identifier associated with the available target transmission server.

Optionally, the core network device is a network data analytics function network element.

Optionally, the second message or the third message is used to obtain information about quality of service of using the available target transmission server at the first location.

The available target transmission server includes one or more transmission servers.

Optionally, that the processing unit 1001 is configured to determine a second transmission server includes:

The processor 1102 determines the quality of service requirement of the application layer application.

The processing unit 1001 obtains, via the communication unit 1002, information about quality of service of using the available target transmission server at the first location.

The processor 1102 determines, based on information about quality of service of the available target transmission server, the second transmission server that satisfies the quality of service requirement of the application layer application, where the second transmission server is one of the available target transmission server.

Optionally, the communication unit 1002 is further configured to send a fourth message to a core network device, where the fourth message is used to obtain the first quality of service monitoring information.

For specific execution procedures of the processing unit 1001 and the communication unit 1002 in this implementation, refer to the corresponding descriptions in the foregoing method embodiments. Details are not described herein again. In the communication method implemented by the apparatus, whether switching is to be performed may be determined based on QoS information obtained through measurement and UE-RAN QoS information, RAN-UPF QoS information, or UE-RAN-UPF QoS information obtained through 5GC monitoring. If the switching is needed, in the communication method implemented by the apparatus, the second transmission server that satisfies the QoS requirement may be determined, so that the first transmission server can be switched to the second transmission server. This helps QoS guarantee.

In another possible implementation, the apparatus is a transmission server, or is located in a transmission server. Specifically, the communication unit 1002 is configured to receive a first message from a first transmission server, where the first message is used to obtain at least one of traffic information and load information of the second transmission server. The processing unit 1001 is configured to send at least one of the traffic information and the load information of the second transmission server to the first transmission server via the communication unit 1002, where at least one of the traffic information and the load information of the second transmission server is used by the first transmission server to determine a transmission server that satisfies the quality of service requirement of the application layer application.

Optionally, the second transmission server is one of the available target transmission server, and the available target transmission server is determined by the first transmission server based on information about an available target application layer server.

For specific execution procedures of the processing unit 1001 and the communication unit 1002 in this implementation, refer to the corresponding descriptions in the foregoing method embodiments. Details are not described herein again. In the communication method implemented by the apparatus, if the second transmission server is any one of the available target transmission server, the first transmission server may obtain a corresponding available target transmission server based on the information about the available target application layer server, to subscribe to at least one of the traffic information and the load information of the available target transmission server. This helps the first transmission server determine, based on at least one of the traffic information and the load information of the available target transmission server, the second transmission server that satisfies the QoS requirement.

In another possible implementation, the apparatus is a transmission server, or is located in a transmission server. Specifically, the communication unit 1002 is configured to receive a second message from a first transmission server, where the second message includes a first location and/or information about an available target application layer server, the first location includes a location area in which a first transmission client served by the first transmission server is located, the information about the available target application layer server is used to determine information about an available target transmission server, and the available target transmission server includes the second transmission server. The processing unit 1001 is configured to send, to the first transmission server via the communication unit 1002, information about quality of service of using the second transmission server at the first location, where the information about the quality of service is used by the first transmission server to determine a transmission server that satisfies the quality of service requirement of the application layer application.

Optionally, the second message is used to obtain information about quality of service of using the available target transmission server at the first location.

For specific execution procedures of the processing unit 1001 and the communication unit 1002 in this implementation, refer to the corresponding descriptions in the foregoing method embodiments. Details are not described herein again. In the communication method implemented by the apparatus, if the second transmission server is any one of the available target transmission server, the first transmission server may obtain the corresponding available target transmission server based on the information about the available target application layer server and/or the first location, to subscribe to the information about the QoS of using the available target transmission server at the first location. This helps the first transmission server determine the second transmission server from the available target transmission server.

In another possible implementation, the apparatus is a transmission server, or is located in a transmission server. Specifically, the processing unit 1001 is configured to obtain a first quality of service requirement. The processing unit

1001 is configured to obtain, via the communication unit 1002, information about quality of service of using a service of the transmission server by the terminal device at a second location. The processing unit 1001 is further configured to determine a second quality of service requirement of the terminal device based on the first quality of service requirement and the information about the quality of service, where the second quality of service requirement includes a set of one or more quality of service parameters.

Optionally, the processing unit 1001 is further configured to send a fifth message to the network data analytics function network element via the communication unit 1002, where the fifth message is used to obtain the information about the quality of service based on the information about the terminal device and the service information of the transmission server. The communication unit 1002 is further configured to receive the information about the quality of service from the network data analytics function network element.

Optionally, the processing unit 1001 is further configured to send a request message to a core network device via the communication unit 1002, where the request message is used to request the core network device to provide guarantee of the second quality of service requirement.

Optionally, the core network device is a network exposure function network element or a policy control function network element.

For specific execution procedures of the processing unit 1001 and the communication unit 1002 in this implementation, refer to the corresponding descriptions in the foregoing method embodiments. Details are not described herein again. In the communication method implemented by the apparatus, after receiving a first quality of service requirement of a VAL server, the transmission server may determine the second quality of service requirement based on the information about the quality of service and the first quality of service requirement, to perform QoS guarantee.

FIG. 11 is a diagram of another communication apparatus according to this application. The communication apparatus is configured to implement the communication method in the foregoing method embodiments. An apparatus 1100 may be a chip system, or may be the device described in the foregoing method embodiments.

The apparatus 1100 includes a communication interface 1101 and a processor 1102. The communication interface 1101 may be, for example, a transceiver, an interface, a bus, a circuit, or an apparatus that can implement a transceiver function. The communication interface 1101 is configured to communicate with another device via a transmission medium, so that the apparatus 1100 can communicate with the another device. The processor 1102 is configured to perform a processing-related operation.

In a possible implementation, the apparatus 1100 may be a transmission server, or may be located in a transmission server. Specifically, the processor 1102 is configured to determine, based on first quality of service measurement information and/or first quality of service monitoring information, that the first transmission server is to be switched. The first quality of service measurement information includes information about quality of service of serving by the first transmission server connected to a first transmission client via a first user plane function network element and a first access network device. The first quality of service monitoring information includes information about quality of service of a path between the first transmission client and the first access network device and/or information about quality of service of a path between the first access network device and the first user plane function network element.

The processor 1102 is further configured to determine a second transmission server, where quality of service of serving by the second transmission server connected to the first transmission client via the first access network device and a second user plane function network element satisfies a quality of service requirement of an application layer application.

Optionally, that the processor 1102 is configured to determine, based on first quality of service measurement information and/or first quality of service monitoring information, that the first transmission server is to be switched includes:

When determining, based on the first quality of service measurement information, that the quality of service of serving by the first transmission server connected to the first transmission client via the first user plane function network element and the first access network device does not satisfy the quality of service requirement of the application layer application, and/or the quality of service of the path between the first transmission client and the first access network device satisfies a quality of service requirement of a first path, the processor 1102 determines that the first transmission server is to be switched.

Optionally, the communication interface 1101 is configured to receive information about an available target application layer server from a first application layer server, where the information about the available target application layer server is used to determine the available target transmission server, and the available target transmission server and the first transmission server access a same data network.

The communication interface 1101 is further configured to send a first message to the available target transmission server, where the first message is used to obtain at least one of traffic information and load information of the available target transmission server.

The available target transmission server includes one or more transmission servers.

Optionally, that the processor 1102 is configured to determine a second transmission server includes:

The processor 1102 determines a quality of service requirement of an application layer application.

The processor 1102 obtains at least one of the traffic information and the load information of the available target transmission server through the communication interface 1101.

The processor 1102 determines, based on at least one of the traffic information and the load information of the available target transmission server, the second transmission server that satisfies the quality of service requirement of the application layer application, where the second transmission server is one of the available target transmission server.

Optionally, the communication interface 1101 is further configured to receive information about an available target application layer server from a first application layer server, where the information about the available target application layer server is used to determine information about an available target transmission server.

The communication interface 1101 is further configured to obtain a first location of the first transmission client.

The communication interface 1101 is further configured to send a second message to the available target transmission server, where the second message includes the first location and/or the information about the available target application layer server.

Optionally, the communication interface 1101 is further configured to receive information about an available target application layer server from a first application layer server, where the information about the available target application layer server is used to determine information about an available target transmission server.

The communication interface 1101 is further configured to obtain a first location of the first transmission client.

The communication interface 1101 is further configured to send a third message to a core network device, where the third message includes one or more of the following information: the first location, the information about the available target transmission server, or a data network access identifier associated with the available target transmission server.

Optionally, the core network device is a network data analytics function network element.

Optionally, the second message or the third message is used to obtain information about quality of service of using the available target transmission server at the first location.

The available target transmission server includes one or more transmission servers.

Optionally, that the processor 1102 is configured to determine a second transmission server includes:

The processor 1102 determines the quality of service requirement of the application layer application.

The processor 1102 obtains, through the communication interface 1101, the information about the quality of service of using the available target transmission server at the first location.

The processor 1102 determines, based on information about quality of service of the available target transmission server, the second transmission server that satisfies the quality of service requirement of the application layer application, where the second transmission server is one of the available target transmission server.

Optionally, the communication interface 1101 is further configured to send a fourth message to a core network device, where the fourth message is used to obtain the first quality of service monitoring information.

For specific execution procedures of the communication interface 1101 and the processor 1102 in this implementation, refer to the descriptions in the foregoing method embodiments. Details are not described herein again. In the communication method implemented by the apparatus, whether switching is to be performed may be determined based on QoS information obtained through measurement and UE-RAN QoS information, RAN-UPF QoS information, or UE-RAN-UPF QoS information obtained through 5GC monitoring. If the switching is needed, in the communication method implemented by the apparatus, the second transmission server that satisfies the QoS requirement may be determined, so that the first transmission server can be switched to the second transmission server. This helps QoS guarantee.

In another possible implementation, the apparatus 1100 may be a transmission server, or may be located in a transmission server. Specifically, the communication interface 1101 is configured to receive a first message from a first transmission server, where the first message is used to obtain at least one of traffic information and load information of the second transmission server. The processor 1102 is configured to send at least one of the traffic information and the load information of the second transmission server to the first transmission server through the communication interface 1101, where at least one of the traffic information and the load information of the second transmission server is used by the first transmission server to determine a transmission server that satisfies the quality of service requirement of the application layer application.

Optionally, the second transmission server is one of the available target transmission server, and the available target transmission server is determined by the first transmission server based on information about an available target application layer server.

For specific execution procedures of the communication interface 1101 and the processor 1102 in this implementation, refer to the descriptions in the foregoing method embodiments. Details are not described herein again. In the communication method implemented by the apparatus, if the second transmission server is any one of the available target transmission server, the first transmission server may obtain a corresponding available target transmission server based on the information about the available target application layer server, to subscribe to at least one of the traffic information and the load information of the available target transmission server. This helps the first transmission server determine the second transmission server based on at least one of the traffic information and the load information of the available target transmission server.

In another possible implementation, the apparatus 1100 may be a transmission server, or may be located in a transmission server. Specifically, the communication interface 1101 is configured to receive a second message from a first transmission server, where the second message includes a first location and/or information about an available target application layer server, the first location includes a location area in which a first transmission client served by the first transmission server is located, the information about the available target application layer server is used to determine information about an available target transmission server, and the available target transmission server includes the second transmission server. The processor 1102 is configured to send, to the first transmission server through the communication interface 1101, information about quality of service of using the second transmission server at the first location, where the information about the quality of service is used by the first transmission server to determine a transmission server that satisfies the quality of service requirement of the application layer application.

Optionally, the second message is used to obtain information about quality of service of using the available target transmission server at the first location.

For specific execution procedures of the communication interface 1101 and the processor 1102 in this implementation, refer to the descriptions in the foregoing method embodiments. Details are not described herein again. In the communication method implemented by the apparatus, if the second transmission server is any one of the available target transmission server, the first transmission server may obtain the corresponding available target transmission server based on the information about the available target application layer server and/or the first location, to subscribe to the information about the QoS of using the available target transmission server at the first location. This helps the first transmission server determine the second transmission server from the available target transmission server.

In another possible implementation, the apparatus 1100 may be a transmission server, or may be located in a transmission server. Specifically, the communication interface 1101 is configured to obtain a first quality of service requirement. The processor 1102 is configured to obtain, through the communication interface 1101, information about quality of service of using a service of the transmission server by the terminal device at a second location. The processor 1102 is further configured to determine a second quality of service requirement of the terminal device based on the first quality of service requirement and the information about the quality of service, where the second quality of service requirement includes a set of one or more quality of service parameters.

Optionally, the processor 1102 is further configured to send a fifth message to the network data analytics function network element through the communication interface 1101, where the fifth message is used to obtain the information about the quality of service based on the information about the terminal device and the service information of the transmission server. The communication interface 1101 is further configured to receive the information about the quality of service from the network data analytics function network element.

Optionally, the processor 1102 is further configured to send a request message to a core network device through the communication interface 1101, where the request message is used to request the core network device to provide guarantee of the second quality of service requirement.

Optionally, the core network device is a network exposure function network element or a policy control function network element.

For specific execution procedures of the communication interface 1101 and the processor 1102 in this implementation, refer to the descriptions in the foregoing method embodiments. Details are not described herein again. In the communication method implemented by the apparatus, after receiving a first quality of service requirement of a VAL server, the transmission server may determine the second quality of service requirement based on the information about the quality of service and the first quality of service requirement, to perform QoS guarantee.

Optionally, the apparatus 1100 may further include at least one memory 1103, configured to store program instructions and/or data. In an implementation, the memory is coupled to the processor. Couplings in this application are indirect couplings or communication connections between apparatuses, units, or modules, and may be electrical, mechanical, or in another form, and are used for information exchange between the apparatuses, the units, and the modules. The processor may perform an operation in collaboration with the memory. The processor may execute the program instructions stored in the memory. The at least one memory and the processor are integrated together.

A specific connection medium between the communication interface, the processor, and the memory is not limited in this application. For example, the memory, the processor, and the communication interface are connected through a bus. A bus 1104 is represented by using a thick line in FIG. 11. A connection manner between other components is merely an example for description, and is not limited thereto. The bus can be divided into an address bus, a data bus, a control bus, and the like. For ease of representation, the bus is represented by using only one bold line in FIG. 11. However, it does not indicate that there is only one bus or only one type of bus.

In this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in this application. The general-purpose processor may be a microprocessor, any conventional processor, or the like. The steps of the methods disclosed with reference to this application may be directly implemented by a hardware processor, or may be implemented by a combination of hardware and a software module in a processor.

In this application, the memory may be a non-volatile memory, for example, a hard disk drive (HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto. The memory in this application may alternatively be a circuit or any other apparatus that can implement a storage function, and is configured to store the program instructions and/or the data.

This application provides another communication apparatus. The device includes a processor. The processor is coupled to a memory. The processor is configured to read and execute computer instructions stored in the memory, to implement the communication method in any embodiment shown in FIG. 6 to FIG. 9.

This application provides a communication system. The communication system includes one or more of the devices in any embodiment shown in FIG. 6 to FIG. 9.

This application provides a computer-readable storage medium. The computer-readable storage medium stores a program or instructions. When the program or instructions are run on a computer, the computer is enabled to perform the communication method in any embodiment shown in FIG. 6 to FIG. 9.

This application provides a computer program product. The computer program product includes instructions. When the instructions are run on a computer, the computer is enabled to perform the communication method in any embodiment shown in FIG. 6 to FIG. 9.

This application provides a chip or a chip system. The chip or chip system includes at least one processor and an interface. The interface and the at least one processor are interconnected through a line. The at least one processor is configured to run a computer program or instructions, to perform the communication method in any embodiment shown in FIG. 6 to FIG. 9.

The interface in the chip may be an input/output interface, a pin, a circuit, or the like.

The chip system may be a system on chip (SoC), a baseband chip, or the like. The baseband chip may include a processor, a channel encoder, a digital signal processor, a modem, an interface module, and the like.

In an implementation, the chip or chip system described above in this application further includes at least one memory, and the at least one memory stores instructions. The memory may be a storage unit inside the chip, for example, a register or a cache, or may be a storage unit (for example, a read-only memory or a random access memory) of the chip.

All or a part of the technical solutions provided in this application may be implemented by using software, hardware, firmware, or any combination thereof. When the software is used to implement the technical solutions, all or a part of the technical solutions may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium, or the like.

In this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, comprising:
determining, by a first transmission server based on first quality of service measurement information and first quality of service monitoring information, that the first transmission server is to be switched, wherein:
the first quality of service measurement information comprises information about quality of service of serving by the first transmission server connected to a first transmission client via a first user plane function network element and a first access network device; and
the first quality of service monitoring information comprises information about quality of service of a path between the first transmission client and the first access network device and information about quality of service of a path between the first access network device and the first user plane function network element; and determining, by the first transmission server, a second transmission server to switch to, wherein quality of service of serving by the second transmission server connected to the first transmission client via the first access network device and a second user plane function network element satisfies a quality of service requirement of an application.

2. The method according to claim 1, wherein determining, by the first transmission server based on the first quality of service measurement information and the first quality of service monitoring information, that the first transmission server is to be switched comprises:
when the first transmission server determines, based on the first quality of service measurement information, that the quality of service of serving by the first transmission server connected to the first transmission client via the first user plane function network element and the first access network device does not satisfy the quality of service requirement of the application, or when the quality of service of the path between the first transmission client and the first access network device satisfies a quality of service requirement of a first path, determining, by the first transmission server, that the first transmission server is to be switched, wherein
the quality of service requirement of the first path is determined by the first transmission server or a core network device.

3. The method according to claim 1, further comprising:
receiving, by the first transmission server, information about an available target transmission server from a first application layer server; and
obtaining, by the first transmission server, information about quality of service of the available target transmission server.

4. The method according to claim 3, wherein obtaining, by the first transmission server, the information about the quality of service of the available target transmission server comprises:
obtaining, by the first transmission server, a first location of the first transmission client; and
sending, by the first transmission server, a second message to the available target transmission server, wherein the second message comprises the first location or the information about the available target transmission servers.

5. The method according to claim 3, wherein obtaining, by the first transmission server, the information about the quality of service of the available target transmission server comprises:
obtaining, by the first transmission server, a first location of the first transmission client; and
sending, by the first transmission server, a third message to a core network device, wherein the third message comprises the first location, the information about the available target transmission server, or a data network access identifier associated with the available target transmission servers.

6. The method according to claim 5, wherein:
information about quality of service of using the available target transmission server at the first location is obtained based on the third message; and
the available target transmission server comprises one or more transmission servers.

7. The method according to claim 5, wherein the core network device is a network data analytics function network element.

8. The method according to claim 3, wherein determining, by the first transmission server, the second transmission server to switch to comprises:
determining, by the first transmission server, the quality of service requirement of the application;
obtaining, by the first transmission server, information about quality of service of using the available target transmission server a first location of the first transmission client; and
determining, by the first transmission server based on the information about the quality of service of the available target transmission server, the second transmission server that satisfies the quality of service requirement, wherein the second transmission server is one of the available target transmission server.

9. The method according to claim 1, further comprising:

sending, by the first transmission server, a fourth message to a core network device, wherein the first quality of service monitoring information is obtained based on the fourth message; or sending, by the first transmission server, a fourth message to a core network device when the quality of service of serving by the first transmission server connected to the first transmission client via the first user plane function network element and the first access network device does not satisfy the quality of service requirement of the application, wherein the first quality of service monitoring information is obtained based on the fourth message.

10. A communication method, comprising:

obtaining, by a first transmission server, first quality of service measurement information and first quality of service monitoring information, wherein:

the first quality of service measurement information comprises information about quality of service of serving by the first transmission server connected to a first transmission client via a first user plane function network element and a first access network device; and the first quality of service monitoring information comprises information about quality of service of a path between the first transmission client and the first access network device and information about quality of service of a path between the first access network device and the first user plane function network element;

determining, by the first transmission server based on the first quality of service measurement information and the first quality of service monitoring information, that deterioration of quality of service of a data flow is caused by abnormal load of the first transmission server or abnormality of a path between the first transmission server and the first user plane function network element; and determining, by the first transmission server, a second transmission server to switch to, wherein quality of service of serving the first transmission client, by the second transmission server, satisfies a quality of service requirement of an application.

11. The method according to claim 10, wherein determining, by the first transmission server, the second transmission server to switch to comprises:

determining, by the first transmission server based on an N6 transmission status or load information of an available target transmission server, the second transmission server that satisfies the quality of service requirement of the application.

12. The method according to claim 10, further comprising:

receiving, by the first transmission server, information about an available target transmission server from a first application layer server, wherein the available target transmission server and the first transmission server access a same data network; and sending, by the first transmission server, a first message to the available target transmission server, wherein the first message is used to obtain traffic information or load information of the available target transmission server; and the available target transmission server comprises one or more transmission servers.

13. The method according to claim 12, wherein sending, by the first transmission server, the first message to the available target transmission server comprises:

sending, by the first transmission server, the first message to the available target transmission server when the quality of service of serving by the first transmission server connected to the first transmission client via the first user plane function network element and the first access network device does not satisfy the quality of service requirement of the application, and quality of service of a first transmission client, first access network device, and first user plane function network element path satisfies a quality of service requirement of a second path.

14. The method according to claim 12, wherein determining, by the first transmission server, the second transmission server to switch to comprises:

determining, by the first transmission server, the quality of service requirement of the application;

obtaining, by the first transmission server, the traffic information or the load information of the available target transmission server; and determining, by the first transmission server based on the traffic information or the load information of the available target transmission server, the second transmission server that satisfies the quality of service requirement of the application, wherein the second transmission server is one of the available target transmission servers.

15. A communication apparatus, comprising a processor and a memory, wherein the memory is configured to store instructions; and when the instructions are executed by the processor, the communication apparatus is enabled to perform the method according to claim 10.

16. A first transmission server, comprising:

at least one processor; and at least one memory, wherein the at least one memory is configured to store instructions, and when the instructions are executed by the processor, the first transmission server is enabled to:

determine, based on first quality of service measurement information and first quality of service monitoring information, that the first transmission server is to be switched, wherein:

the first quality of service measurement information comprises information about quality of service of serving by the first transmission server connected to a first transmission client via a first user plane function network element and a first access network device; and the first quality of service monitoring information comprises information about quality of service of a path between the first transmission client and the first access network device and information about quality of service of a path between the first access network device and the first user plane function network element; and determine a second transmission server to switch to, wherein quality of service of serving by the second transmission server connected to the first transmission client via the first access network device and a second user plane function network element satisfies a quality of service requirement of an application.

17. The first transmission server according to claim 16, wherein the instructions to determine, based on the first quality of service measurement information and the first quality of service monitoring information, that the first transmission server is to be switched comprises further instructions to:

when determining, based on the first quality of service measurement information, that the quality of service of serving by the first transmission server connected to the first transmission client via the first user plane function network element and the first access network device does not satisfy the quality of service requirement of the application, or when the quality of service of the path between the first transmission client and the first access network device satisfies a quality of service requirement of a first path, determine that the first transmission server is to be switched, wherein the quality of service requirement of the first path is determined by the first transmission server or a core network device.

18. The first transmission server according to claim 16, wherein the instructions include further instructions to:

receive information about an available target transmission server from a first application layer server; and obtain information about quality of service of the available target transmission server.

19. The first transmission server according to claim 18, wherein the instructions to obtain the information about the quality of service of the available target transmission server comprise instructions to:

obtain a first location of the first transmission client; and send a second message to the available target transmission server, wherein the second message comprises the first location or the information about the available target transmission server.

20. The first transmission server according to claim 18, wherein the instructions to obtain the information about the quality of service of the available target transmission server comprise instructions to:

obtain a first location of the first transmission client; and send a third message to a core network device, wherein the third message comprises the first location, the information about the available target transmission server, or a data network access identifier associated with the available target transmission server.

* * * * *